United States Patent
Saito

(10) Patent No.: US 9,203,478 B2
(45) Date of Patent: Dec. 1, 2015

(54) POWER SUPPLY DEVICE AND DRIVING METHOD THEREOF

(75) Inventor: Toshihiko Saito, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 709 days.

(21) Appl. No.: 13/070,517

(22) Filed: Mar. 24, 2011

(65) Prior Publication Data

US 2011/0241435 A1    Oct. 6, 2011

(30) Foreign Application Priority Data

Mar. 31, 2010 (JP) ................. 2010-083153

(51) Int. Cl.
  *H01F 38/14*  (2006.01)
  *H04B 5/00*   (2006.01)
  *H02J 5/00*   (2006.01)
  *H02J 7/02*   (2006.01)

(52) U.S. Cl.
  CPC .............. *H04B 5/0093* (2013.01); *H02J 5/005* (2013.01); *H02J 7/025* (2013.01); *H04B 5/0037* (2013.01); *H01F 38/14* (2013.01)

(58) Field of Classification Search
  CPC combination set(s) only.
  See application file for complete search history.

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 5,990,516 A | 11/1999 | Momose et al. | |
| 6,229,164 B1 | 5/2001 | Momose et al. | |
| 6,294,274 B1 | 9/2001 | Kawazoe et al. | |
| 6,410,952 B2 | 6/2002 | Momose et al. | |
| 6,563,174 B2 | 5/2003 | Kawasaki et al. | |
| 6,642,560 B2 | 11/2003 | Momose et al. | |
| 6,727,522 B1 | 4/2004 | Kawasaki et al. | |

(Continued)

FOREIGN PATENT DOCUMENTS

| EP | 1724048 A2 | 11/2006 |
|---|---|---|
| EP | 1737044 A | 12/2006 |

(Continued)

OTHER PUBLICATIONS

International Search Report (Application No. PCT/JP2011/057514) Dated May 10, 2011.

(Continued)

*Primary Examiner* — Jared Fureman
*Assistant Examiner* — Aqeel Bukhari
(74) *Attorney, Agent, or Firm* — Eric J. Robinson; Robinson Intellectual Property Law Office, P.C.

(57) ABSTRACT

An object of the present invention is to provide a highly reliable power supply device which can withstand long-term use. Another object of the present invention is to provide a power supply device with reduced power consumption. The power supply device includes a cell including an antenna and a switch and performing position detection operation and power feeding operation; a high-frequency wave supply circuit; a switch control circuit; and a potential detecting circuit. One electrode of the antenna is connected to the high-frequency wave supply circuit through the switch, and the other thereof is connected to the potential detecting circuit. By the position detection operation, whether there is a power receiving device which gets close to a cell or not is detected. Only when the power receiving device is detected, power is supplied by the power feeding operation.

20 Claims, 9 Drawing Sheets

(56) References Cited

U.S. PATENT DOCUMENTS

| | | |
|---|---|---|
| 6,929,990 B2 | 8/2005 | Momose et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,112,952 B2 | 9/2006 | Arai et al. |
| 7,211,825 B2 | 5/2007 | Shih et al |
| 7,233,137 B2 | 6/2007 | Nakamura et al. |
| 7,282,752 B2 | 10/2007 | Momose et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,683,429 B2 | 3/2010 | Yamaguchi et al. |
| 7,732,819 B2 | 6/2010 | Akimoto et al. |
| 7,923,870 B2 | 4/2011 | Jin |
| 7,948,208 B2 | 5/2011 | Partovi et al. |
| 7,952,322 B2 | 5/2011 | Partovi et al. |
| 8,067,775 B2 * | 11/2011 | Miyairi et al. .................. 257/72 |
| 8,115,201 B2 | 2/2012 | Yamazaki et al. |
| 8,169,185 B2 | 5/2012 | Partovi et al. |
| 8,432,502 B2 | 4/2013 | Yamazaki et al. |
| 8,492,760 B2 | 7/2013 | Yamazaki et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0048250 A1 | 2/2008 | Momose et al. |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0231120 A1 | 9/2008 | Jin |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0052430 A1 * | 3/2010 | Takaishi et al. ................ 307/104 |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0050164 A1 | 3/2011 | Partovi et al. |
| 2011/0089857 A1 | 4/2011 | Diederiks |
| 2011/0176263 A1 | 7/2011 | Yamazaki et al. |
| 2011/0187688 A1 | 8/2011 | Yamazaki et al. |
| 2011/0221385 A1 | 9/2011 | Partovi et al. |
| 2012/0126745 A1 | 5/2012 | Partovi et al. |
| 2013/0175875 A1 * | 7/2013 | Kurs et al. ..................... 307/104 |

FOREIGN PATENT DOCUMENTS

| | | |
|---|---|---|
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2000-208430 A | 7/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2005-110421 A | 4/2005 |
| JP | 2005-217436 A | 8/2005 |
| JP | 2008-236916 A | 10/2008 |
| JP | 2008-252113 A | 10/2008 |
| JP | 2009-271846 A | 11/2009 |
| JP | 2010-062229 A | 3/2010 |
| JP | 2010-062546 A | 3/2010 |
| JP | 2010-527226 | 8/2010 |
| TW | 201007529 | 2/2010 |
| WO | WO-2004/114391 | 12/2004 |

(56) References Cited

FOREIGN PATENT DOCUMENTS

| WO | WO-2008/032746 | 3/2008 |
|---|---|---|
| WO | WO-2009/136619 | 11/2009 |
| WO | WO-2009/150573 | 12/2009 |

OTHER PUBLICATIONS

Written Opinion (Application No. PCT/JP2011/057514) Dated May 10, 2011.
Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.
Dembo.H et al., "RFCPUS on Glass and Plastic Substrates Fabricated by TFT Transfer Technology,". IEDM 05: Technical Digest of International Electron Devices Meeting, Dec. 5, 2005, pp. 1067-1069.
Ikeda.T et al., "Full-Functional System Liquid Crystal Display Using Cg-Silicon Technology,", SID Digest '04 : SID International Symposium Digest of Technical Papers, 2004, vol. 35, pp. 860-863.
Nomura.K et al., "Room-Temperature Fabrication of Transparent Flexible Thin-Film Transistors Using Amorphous Oxide Semiconductors,", Nature, Nov. 25, 2004, vol. 432, pp. 488-492.
Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.
Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.
Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.
Prins.M et al., "A Ferroelectric Transparent Thin-Film Transistor,", Appl. Phys. Lett. (Applied Physics Letters), Jun. 17, 1996, vol. 68, No. 25, pp. 3650-3652.
Nakamura.M et al., "The phase relations in the $In_2O_3$—$Ga_2ZnO_4$—ZnO system at 1350° C.,", Journal of Solid State Chemistry, Aug. 1, 1991, vol. 93, No. 2, pp. 298-315.
Kimizuka.N et al., "Syntheses and Single-Crystal Data of Homologous Compounds, $In_2O_3(ZnO)_m$ (m=3, 4, and 5), $InGaO_3(ZnO)_3$, and $Ga_2O_3(ZnO)_m$ (m=7, 8, 9, and 16) in the $In_2O_3$—$ZnGa_2O_4$—ZnO System,", Journal of Solid State Chemistry, Apr. 1, 1995, vol. 116, No. 1, pp. 170-178.
Nomura.K et al., "Thin-Film Transistor Fabricated in Single-Crystalline Transparent Oxide Semicondutor,", Science, May 23, 2003, vol. 300, No. 5623, pp. 1269-1272.
Masuda.S et al., "Transparent thin film transistors using ZnO as an active channel layer and their electrical properties,", J. Appl. Phys. (Journal of Applied Physics), Feb. 1, 2003
Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.
Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.
Nomura.K et al., "Carrier transport in transparent oxide semiconductor with intrinsic structural randomness probed using single-crystalline $InGaO_6(ZnO)_5$ films,", Appl. Phys. Lett.(Applied Physics Letters), Sep. 13, 2004, vol. 85, No. 11, pp. 1993-1995.
Li.C et al., "Modulated Structures of Homologous Compounds $InMO_3(ZnO)m$ (M=In,Ga; m=Integer) Described by Four-Dimensional Superspace Group,", Journal of Solid State Chemistry, 1998, vol. 139, pp. 347-355.
Son.K et al., "42.4L: Late-News Paper: 4 Inch QVGA AMOLED Driven by the Threshold Voltage Controlled Amorphous GIZO ($Ga_2O_3$—$In_2O_3$—ZnO) TFT,", SID Digest '08 : SID International Symposium Digest of Technical Papers, May 20, 2008, vol. 39, pp. 633-636.
Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.
Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.
Kanno.H et al., "White Stacked Electrophosphorecent Organic Light-Emitting Devices Employing MoO3 as a Charge-Generation Layer,", Adv. Mater. (Advanced Materials), 2006, vol. 18, No. 3, pp. 339-342.
Tsuda.K et al., "Ultra Low Power Consumption Technologies for Mobile TFT-LCDs ,", IDW '02 : Proceedings of the 9th International Display Workshops, Dec. 4, 2002, pp. 295-298.
Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.
Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.
Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure,", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems,", Journal of Solid-State Circuits , 2008, vol. 43, No. 1, pp. 292-299.
Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.
Cho.D et al., "21.2:Al and Sn-Doped Zinc Indium Oxide Thin Film Transistors for AMOLED Back Plane,", SID Digest '09 : SID International Symposium Digest of Technical Papers, May 31, 2009, pp. 280-283.
Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission AMOLED Display on Plastic Film and its Bending Properties,", SID Digest '09 : SID International Symposium Digest of Technical Papers, May 31, 2009, pp. 983-985.
Sakata.J et al., "Development of 4.0-In. AMOLED Display With Driver Circuit Using Amorphous In—Ga—Zn—Oxide TFTs,", IDW '09 : Proceedings of the 16th International Display Workshops, 2009, pp. 689-692.
Park.J et al., "Amorphous Indium—Gallium—Zinc Oxide TFTs and Their Application for Large Size AMOLED,", AM-FPD '08 Digest of Technical Papers, Jul. 2, 2008, pp. 275-278.
Park.S et al., "Challenge to Future Displays: Transparent AM-OLED Driven by PEALD Grown ZnO TFT,", IMID '07 Digest, 2007, pp. 1249-1252.
Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.
Osada.T et al., "Development of Driver-Integrated Panel Using Amorphous In—Ga—Zn—Oxide TFT,", AM-FPD '09 Digest of Technical Papers, Jul. 1, 2009, pp. 33-36.
Hirao.T et al., "Novel Top-Gate Zinc Oxide Thin-Film Transistors (ZnO TFTs) for AMLCDs,", Journal of the SID, 2007, vol. 15, No. 1, pp. 17-22.

(56) References Cited

OTHER PUBLICATIONS

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.
Ohara.H et al., "21.3:4.0 In. QVGA AMOLED Display Using In—Ga—Zn—Oxide TFTs With a Novel Passivation Layer,", SID Digest '09 : SID International Symposium Digest of Technical Papers, May 31, 2009, pp. 284-287.
Miyasaka.M, "SUFTLA Flexible Microelectronics on Their Way to Business,", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.
Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.
Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.
Lee.H et al., "Current Status of, Challenges to, and Perspective View of AM-OLED ,", IDW '06 : Proceedings of the 13th International Display Workshops, Dec. 7, 2006, pp. 663-666.
Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.
Nakamura.M, "Synthesis of Homologous Compound with New Long-Period Structure,", NIRIM Newsletter, Mar. 1, 1995, vol. 150, pp. 1-4.
Kikuchi.H et al., "Polymer-Stabilized Liquid Crystal Blue Phases,", Nature Materials, Sep. 2, 2002, vol. 1, pp. 64-68.
Kimizuka.N et al., "Spinel,$YbFe_2O_4$, and $Yb_2Fe_3O_7$ Types of Structures for Compounds in the $In_2O_3$ and $Sc_2O_3$—$A_2O_3$—BO Systems [A; Fe, Ga, or Al; B: Mg, Mn, Fe, Ni, Cu,or Zn] at Temperatures Over 1000° C.,", Journal of Solid State Chemistry, 1985, vol. 60, pp. 382-384.
Kitzerow.H et al., "Observation of Blue Phases in Chiral Networks,", Liquid Crystals, 1993, vol. 14, No. 3, pp. 911-916.
Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.
Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.
Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.
Orita.M et al., "Mechanism of Electrical Conductivity of Transparent $InGaZnO_4$,", Phys. Rev. B (Physical Review. B), Jan. 15, 2000, vol. 61, No. 3, pp. 1811-1816.
Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.
Janotti.A et al., "Native Point Defects in ZnO,", Phys. Rev. B (Physical Review. B), Oct. 4, 2007, vol. 76, No. 16, pp. 165202-1-165202-22.
Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.
Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.
Janotti.A et al., "Oxygen Vacancies in ZnO,", Appl. Phys. Lett. (Applied Physics Letters) , 2005, vol. 87, pp. 122102-1-122102-3.
Oba.F et al., "Defect energetics in ZnO: A hybrid Hartree-Fock density functional study,", Phys. Rev. B (Physical Review. B), 2008, vol. 77, pp. 245202-1-245202-6.
Orita.M et al., "Amorphous transparent conductive oxide $InGaO_3(ZnO)_m$ (m<4):a Zn 4s conductor,", Philosophical Magazine, 2001, vol. 81, No. 5, pp. 501-515.
Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.
Mo.Y et al., "Amorphous Oxide TFT Backplanes for Large Size AMOLED Displays,", IDW '08 : Proceedings of the 6th International Display Workshops, Dec. 3, 2008, pp. 581-584.
Kim.S et al., "High-Performance oxide thin film transistors passivated by various gas plasmas,", 214th ECS Meeting, 2008, No. 2317, ECS.
Clark.S et al., "First Principles Methods Using CASTEP,", Zeitschrift fur Kristallographie, 2005, vol. 220, pp. 567-570.
Lany.S et al., "Dopability, Intrinsic Conductivity, and Nonstoichiometry of Transparent Conducting Oxides,", Phys. Rev. Letts. (Physical Review Letters), Jan. 26, 2007, vol. 98, pp. 045501-1-045501-4.
Takamiya.M et al., "Wireless Power Transmission Sheet with Organic FETs and Plastic MEMS Switches,", IDW '07 : Proceedings of the 14th International Display Workshops, Dec. 5, 2007, pp. 95-98.
Sekitani.T et al., "A large-area flexible wireless power transmission sheet using printed plastic MEMS switches and organic field-effect transistors,", IEDM 06: Technical Digest of International Electron Devices Meeting, 2006, pp. 30-33.
Takamiya.M et al., "20.4 Design Solutions for a Multi-Object Wireless Power Transmission Sheet Based on Plastic Switches,", ISSCC 2007 (Digest of Technical Papers. IEEE International Solid-State Circuits Conference), Feb. 11, 2007, pp. 362-363, 609 (3 pages).
Park.J at al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.
Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.
Ueno.K et al., "Field-Effect Transistor on $SrTiO_3$ With Sputtered $Al_2O_3$ Gate Insulator,", Appl. Phys. Lett. (Applied Physics Letters), Sep. 1, 2003, vol. 83, No. 9, pp. 1755-1757.
Taiwanese Office Action (Application No. 100110788) Dated Aug. 12, 2015.

* cited by examiner

POWER SUPPLY DEVICE AND DRIVING METHOD THEREOF

TECHNICAL FIELD

The present invention relates to a power supply device. In particular, the present invention relates to a power supply device which supplies power by a radio signal.

In this specification, a semiconductor device means all types of devices which can function by utilizing semiconductor characteristics, and an imaging device, a display device, an electro-optical device, a power supply device, a semiconductor circuit, an electronic device, and the like are all semiconductor devices.

BACKGROUND ART

In recent years, with the development of information communication technology, the realization of a ubiquitous society is proposed in which free communication of information and a variety of services can be achieved by connecting a variety of electronic devices to a computer network. The word "ubiquitous" comes from the Latin meaning "existing or being everywhere" (being omnipresent) and means that the processing of information using computers is naturally widespread throughout a living environment through electronic devices without any awareness of computers at anytime and anywhere.

In order to make an electronic device operate, power needs to be supplied to the electronic device (hereinafter, also referred to as power feeding). Power is supplied to a portable electronic device typified by a mobile phone and the like by a built-in battery. The battery is charged in the following manner: the electronic device is set in a battery charger and power is received from a commercial power supply distributed to each house. In addition, a contact needs to be provided to connect the electronic device and the battery charger; however, a non-contact power supply method utilizing electromagnetic induction phenomenon which does not need a contact is known because a malfunction due to a contact defect is prevented, a design to which waterproof function is imparted is easily made, and the like.

If positioned alignment of a power feeding side and a power receiving side is not doned accurately in charging by electromagnetic induction, efficient power supply has been difficult; however, in recent years, a sheet-like power supply device has been known in which the power supply efficiency is improved in such a manner that a plurality of power feeding coils are arranged to have a sheet-like shape and power is supplied from only a power feeding coil over which an electronic device which receives power is placed (Non-Patent Document 1).

By supplying power using a radio signal made by electromagnetic induction, the electronic device can be made to operate without consideration of a power supply cord, a position of an outlet, and the like. A power feeding coil functions as an antenna for supplying power using a radio signal.

REFERENCE

Non-Patent Document

[Non-Patent Document 1] M. Takamiya, T. Sekitani, Y. Miyamoto, Y. Noguchi, H. Kawaguchi, T. Someya, and T. Sakurai, "Wireless Power Transmission Sheet with Organic FETs and Plastic MEMS Switches", IDW, 2007, pp. 95-98

DISCLOSURE OF INVENTION

The sheet-like power supply device including a plurality of power feeding coils (power feeding antennas) described above includes a power feeding switch for supplying a high-frequency power (hereinafter, also referred to as a high-frequency wave) to a specific power feeding coil; and a position detecting switch for detecting a power feeding coil over which an electronic device which receives power is placed using the high-frequency wave. A mechanical switch manufactured using a micro electro mechanical system (MEMS) technology is used as the power feeding switch because high voltage and a large amount of current need to flow; however, there are problems in that it has a low operation speed and cannot withstand long-term use because of its poor durability.

The position detecting switch requires higher speed operation than the power feeding switch and is easily manufactured by a printing method typified by an ink jet method; therefore, an organic field effect transistor (OFET) is used. However, an OFET has a high drive voltage of several tens of voltage and thus consumes much power in position detection operation. The position detecting switch requires reduction in drive voltage and higher speed operation.

Since the power feeding switch and the position detecting switch satisfy different required specifications, they need to be formed separately; thus, manufacturing steps become complicated.

Since high-frequency waves with different frequencies are used as a high-frequency wave for supplying power and a high-frequency wave for detecting a position, a high-frequency wave supply circuit for supplying power and a high-frequency wave supply circuit for detecting a position need to be provided separately, whereby a circuit configuration becomes complicated. Therefore, the number of components is increased, and improvement in productivity and cost reduction are difficult to achieve.

An object of one embodiment of the present invention is to provide a highly reliable power supply device which can withstand long-term use.

Another object of one embodiment of the present invention is to provide a power supply device with high productivity.

Another object of one embodiment of the present invention is to provide a power supply device with reduced power consumption.

Each embodiment of the invention disclosed in this specification achieves at least one of the above objects.

One embodiment of the present invention is a power supply device which includes an antenna, a switch including an oxide semiconductor, and a high-frequency wave supply circuit. The antenna and the high-frequency wave supply circuit are connected to each other through the switch including an oxide semiconductor.

One embodiment of the present invention is a power supply device which includes a plurality of cells arranged in a matrix, a high-frequency wave supply circuit, a switch control circuit, and a potential detecting circuit. The cell includes an antenna and a transistor including an oxide semiconductor in a channel formation region. One electrode (terminal) of the antenna is connected to the high-frequency wave supply circuit through the transistor including an oxide semiconductor in the channel formation region. The other electrode (terminal) of the antenna is connected to the potential detecting circuit.

By position detection operation, a cell over which a power receiving device is placed is detected from the plurality of cells arranged in a matrix, and by power feeding operation, power is transmitted to only the cell over which the power receiving device is placed, so that efficient power transmission can be realized.

For high-frequency waves used for the position detection operation and the power feeding operation, high-frequency waves with the same frequency can be used. The position detection operation can be performed with power smaller than power used for the power feeding operation.

The position detection operation and the power feeding operation are performed alternately. A power feeding operation period is preferably longer than a position detection operation period.

Another embodiment of the present invention is a power supply device which includes a plurality of power feeding cells arranged in a matrix, a first high-frequency wave supply circuit, a second high-frequency wave supply circuit, a first switch control circuit, a second switch control circuit, and a potential detecting circuit. The power feeding cell includes an antenna, a first switch, and a second switch. One electrode (terminal) of the antenna is connected to the first high-frequency wave supply circuit through the first switch and to the second high-frequency wave supply circuit through the second switch. The other electrode (terminal) of the antenna is connected to the potential detecting circuit.

A transistor including an oxide semiconductor in a channel formation region is used as one or both of the first switch and the second switch.

The first high-frequency wave supply circuit supplies a high-frequency wave for power feeding operation, and the second high-frequency wave supply circuit supplies a high-frequency wave for position detection operation.

When high-frequency waves with different frequencies are used in the power feeding operation and the position detection operation, the power feeding operation and the position detection operation can be performed at the same time. In addition, the frequency of the high-frequency wave for the power feeding operation is preferably higher than the frequency of the high-frequency wave for the position detection operation.

A highly reliable power supply device which can withstand long-term use can be provided. A power supply device with reduced power consumption can be provided.

BEST MODE FOR CARRYING OUT THE INVENTION

Figure 1A:
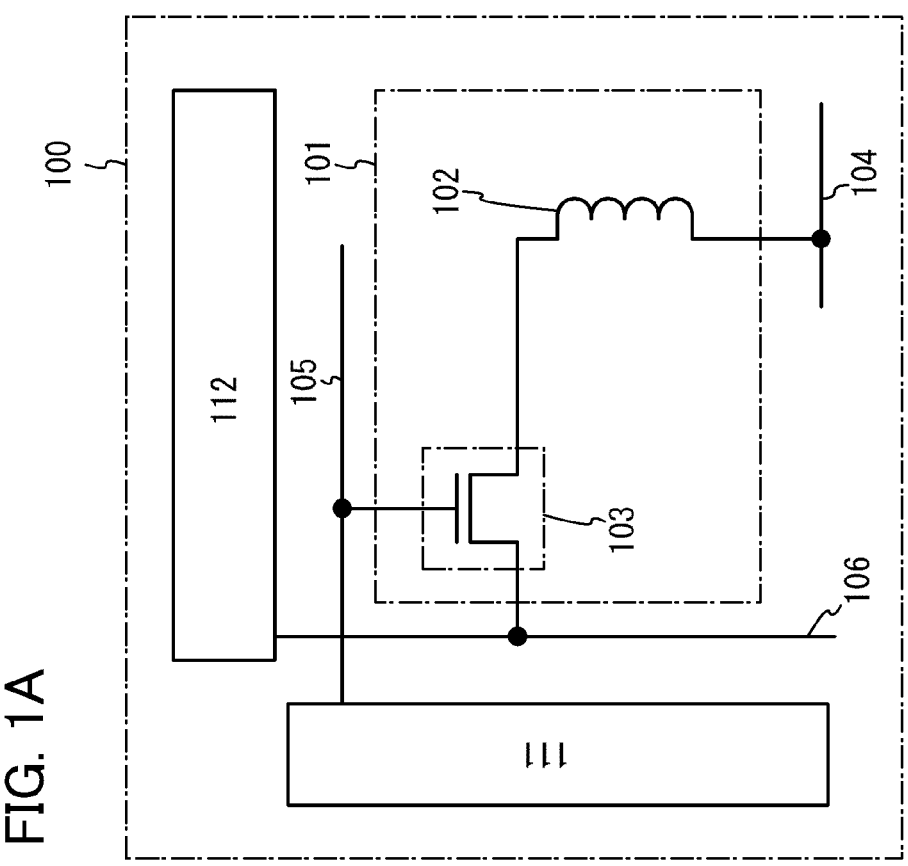
FIGS. 1A and 1B illustrate a power supply device and a power receiving device.

Hereinafter, embodiments of the present invention will be described in detail with reference to the accompanying drawings. However, the present invention is not limited to the description below, and it is easily understood by those skilled in the art that modes and details disclosed herein can be modified in various ways. Therefore, the present invention is not construed as being limited to description of the embodiments.

A transistor is a kind of semiconductor elements and can achieve amplification of current or voltage, switching operation for controlling conduction or non-conduction, or the like. A transistor in this specification includes an insulated-gate field effect transistor (IGFET) and a thin film transistor (TFT).

Note that the position, the size, the range, or the like of each structure illustrated in drawings and the like is not accurately represented in some cases for easy understanding. Therefore, the disclosed invention is not necessarily limited to such a position, size, range, or the like disclosed in the drawings and the like. In the drawings for explaining the embodiments, the same parts or parts having a similar function are denoted by the same reference numerals, and description of such parts is not repeated.

Note that in this specification and the like, the term such as "electrode" or "wiring" does not limit the function of the component. For example, an "electrode" can be used as part of a "wiring", and vice versa. Further, the term "electrode" or "wiring" can also mean a combination of a plurality of "electrodes" and "wirings" formed in an integrated manner.

Note that in this specification and the like, the term "connection" includes not only direct connection but also indirect connection without departing from the purpose and the function.

Note that in this specification and the like, ordinal numbers such as "first", "second", and "third" are used in order to avoid confusion among components, and the terms do not mean limitation of the number of components.

Note that in this specification and the like, since a source and a drain of a transistor may interchange depending on the structure, the operating condition, or the like of the transistor, it is difficult to define which is a source or a drain. Therefore, the terms "source" and "drain" can be switched in this specification and the like.

Embodiment 1

In this embodiment, an example of a power supply device which is one embodiment of the present invention will be described with reference to FIGS. 1A and 1B.

A power supply device 100 illustrated in FIG. 1A includes a power feeding switch control circuit 111, a high-frequency wave supply circuit 112, and at least one power feeding cell 101. The power feeding cell 101 includes a power feeding antenna 102 and a power feeding switch 103. For the power feeding switch 103, a transistor including an oxide semiconductor in a channel formation region is used. The power feeding switch 103 functions as a switch for controlling supply of a high-frequency wave to the power feeding antenna 102. One electrode (terminal) of a source electrode and a drain electrode of the power feeding switch 103 is connected to a wiring 106, and a gate electrode (control terminal) of the power feeding switch 103 is connected to a wiring 105. Further, the other electrode (terminal) of the source electrode and the drain electrode of the power feeding switch 103 is connected to one electrode (terminal) of the power feeding antenna 102, and the other electrode (terminal) of the power feeding antenna 102 is connected to a wiring 104.

The power feeding antenna 102 has a coil shape in this embodiment; however, the shape of the power feeding antenna 102 is not limited thereto, and may be determined as appropriate in consideration of a frequency of a high-frequency wave used for supplying power. Instead of a coiled antenna, a monopole antenna, a dipole antenna, a patch antenna, or the like can be used.

Although a common potential or a ground potential is applied to the wiring 104, a predetermined potential may be alternatively applied thereto. In addition, the wiring 104 may be connected to another circuit. The wiring 105 is connected to the power feeding switch control circuit 111 and transmits a signal (potential) for turning on/off the power feeding switch 103 from the power feeding switch control circuit 111 to the control terminal of the power feeding switch 103. The high-frequency wave supply circuit 112 includes a high-frequency power supply generating a high-frequency wave and supplies a high-frequency wave to the power feeding antenna 102 through the wiring 106 and the power feeding switch 103.

Figure 1B:
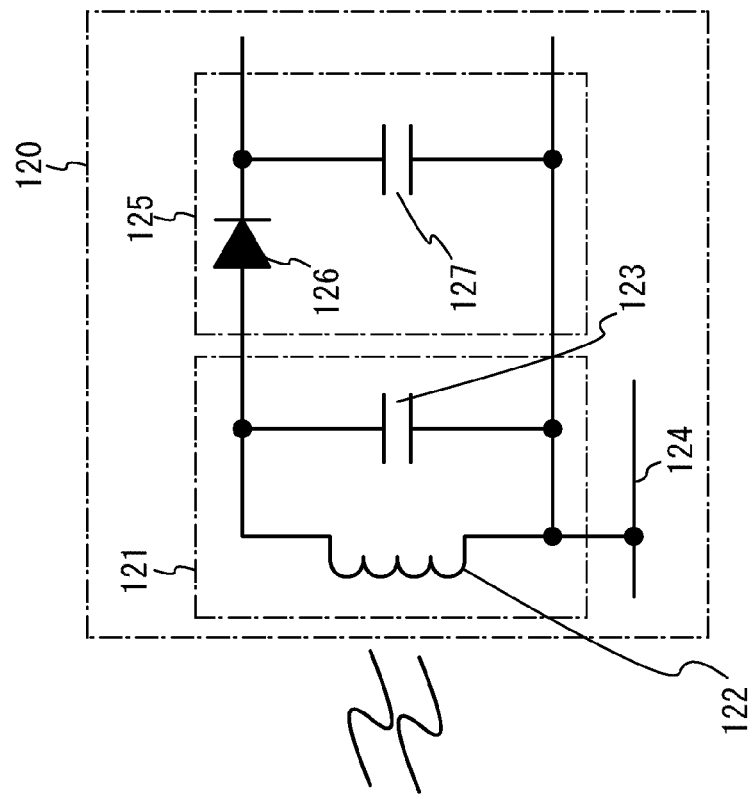

A power receiving device 120 illustrated in FIG. 1B includes a power receiving circuit 121 and a rectifier circuit 125. The power receiving circuit 121 includes a power receiving antenna 122 and a resonant capacitor 123 which form an LC parallel resonance circuit. Further, the power receiving antenna 122 is connected to a wiring 124. Although a common potential or a ground potential is applied to the wiring 124, a predetermined potential may be alternatively applied thereto. In addition, the wiring 124 may be connected to another circuit. The rectifier circuit 125 includes a rectifier element 126 and a smoothing capacitor 127.

The frequency of the high-frequency wave which the high-frequency wave supply circuit 112 supplies is not limited to a specific frequency, and for example, any of the following frequencies can be used: higher than or equal to 300 GHz and lower than 3 THz, which are frequencies of sub-millimeter waves; higher than or equal to 30 GHz and lower than 300 GHz, which are frequencies of millimeter waves; higher than or equal to 3 GHz and lower than 30 GHz, which are frequencies of microwaves; higher than or equal to 300 MHz and lower than 3 GHz, which are frequencies of ultrashort waves; higher than or equal to 30 MHz and lower than 300 MHz, which are frequencies of very short waves; higher than or equal to 3 MHz and lower than 30 MHz, which are frequencies of shortwaves; higher than or equal to 300 kHz and lower than 3 MHz, which are frequencies of medium waves; higher than or equal to 30 kHz and lower than 300 kHz, which are frequencies of long waves; and higher than or equal to 3 kHz and lower than 30 kHz, which are frequencies of very long waves.

Power supply from the power supply device 100 to the power receiving device 120 without a contact therebetween is described here. As a method of power supply from the power supply device 100 to the power receiving device 120, an electromagnetic coupling method or an electromagnetic induction method can be used. In other words, by utilizing an electromagnetic induction phenomenon caused by change in electric field density, power is supplied without an electrical contact. Specifically, first, a high-frequency wave (e.g., 13.56 MHz) is supplied from the high-frequency wave supply circuit 112 to the wiring 106. Next, when the power feeding switch control circuit 111 transmits a signal for turning on the power feeding switch 103 to the control terminal of the power feeding switch 103 through the wiring 105, the power feeding switch 103 is turned on, so that the high-frequency wave is supplied to the power feeding antenna 102. When the high-frequency wave is supplied to the power feeding antenna 102, a magnetic field in which the density is changed in accordance with the frequency of the high-frequency wave is generated from the power feeding antenna 102.

The change of the magnetic field generated from the power feeding antenna 102 causes induced current in the power receiving antenna 122 included in the power receiving circuit 121. In this manner, power can be supplied from the power supply device 100 to the power receiving device 120.

Since the power receiving circuit 121 includes an LC parallel resonance circuit in which the power receiving antenna 122 and the resonant capacitor 123 are combined, it can receive only power of a specific frequency. The specific frequency is determined by the inductance of the power receiving antenna 122 and the conductance of the resonant capacitor 123. When the power receiving circuit 121 receives a plurality of magnetic fields having different frequencies at the same time, an electromagnetic induction phenomenon hardly occurs. In contrast, the power receiving circuit 121 receives only power of a specific frequency, it can receive power efficiently.

Note that power received by the power receiving circuit 121 is alternating current power; however, it can be converted to direct current power by the rectifier circuit 125. In the case where it is not necessary to convert it to direct current power, the rectifier circuit 125 is not necessarily provided.

As the method of power supply, a microwave method or the like can be used instead of an electromagnetic coupling method and an electromagnetic induction method. The method of power supply may be selected by a practitioner in consideration of an intended use.

In this embodiment, a transistor including an oxide semiconductor in a channel formation region is used for the power feeding switch. Since the band gap of the oxide semiconductor is greater than or equal to 3 eV which is much wider than that of silicon, germanium, or the like, even when a large amount of current flows, hot-carrier degradation is hardly caused and a large amount of power can be supplied. Further, since the transistor including an oxide semiconductor in the channel formation region does not have a mechanical contact, a highly-reliable power supply device which has an excellent withstand property and can withstand long-term use can be provided.

In addition, in the transistor including an oxide semiconductor in the channel formation region, the off-state current per micrometer in channel width at room temperature can be less than or equal to 10 aA/μm ($1 \times 10^{-17}$ A/μm), less than or equal to 1 aA/μm ($1 \times 10^{-18}$ A/μm), further less than or equal to 1 zA/μm ($1 \times 10^{-21}$ A/μm), still further less than or equal to 1 yA/μm ($1 \times 10^{-24}$ A/μm). Therefore, when the transistor including an oxide semiconductor in the channel formation region is used as the power feeding switch, unnecessary output of a high-frequency wave to the power feeding antenna 102 can be prevented.

For the power feeding switch, a transistor including an inorganic semiconductor such as silicon (Si), germanium (Ge), or silicon carbide (SiC) in a channel formation region can be used; however, the transistor including an oxide semiconductor in the channel formation region, in which degradation is hardly caused and both supply of a large amount of current and a smaller amount of off-state current can be realized, is preferably used.

As described above, the transistor including an oxide semiconductor in the channel formation region is used for the power feeding switch included in the power supply device 100, whereby a highly-reliable low-power-consumption power supply device which can supply a large amount of power and can withstand long-term use can be provided.

This embodiment can be implemented in appropriate combination with any of the other embodiments.

Embodiment 2

In this embodiment, a position detecting device which can be used for a power supply device of one embodiment of the present invention will be described. By using the position detecting device, whether there is a power receiving device or not can be detected.

Figure 2:
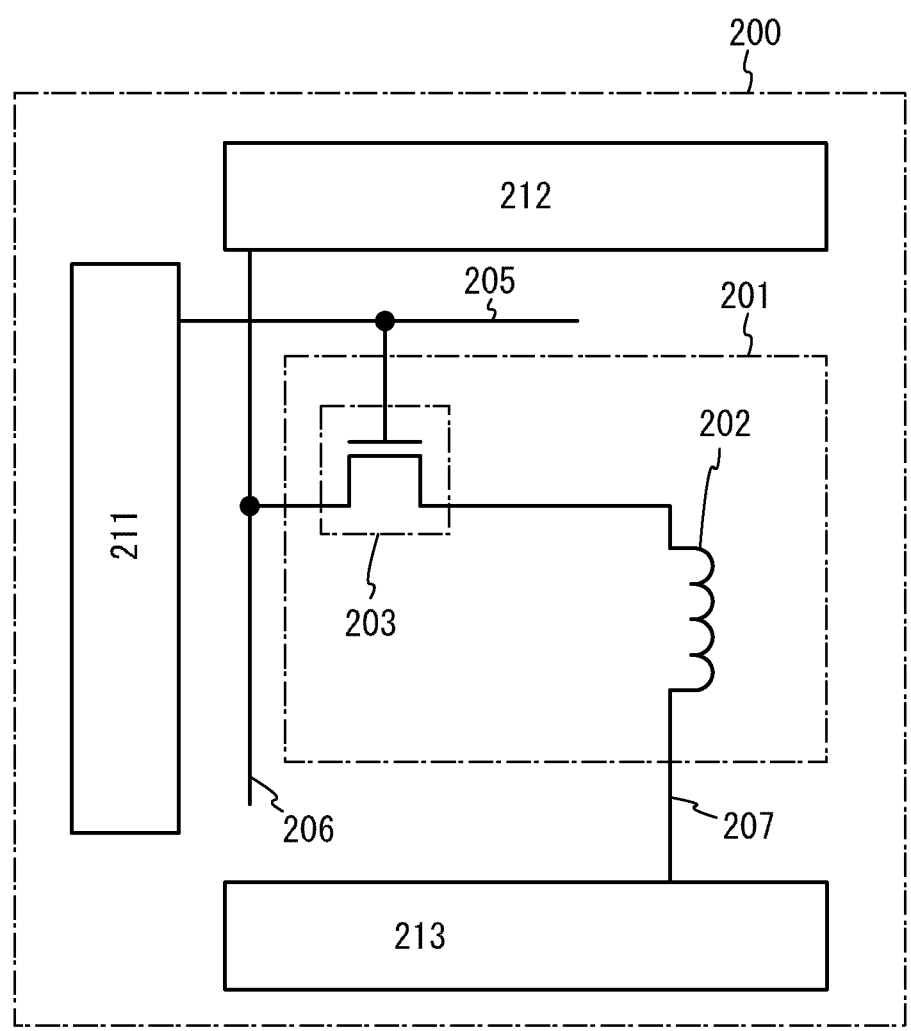
FIG. 2 illustrates a position detecting device.

A position detecting device 200 illustrated in FIG. 2 includes a position detecting switch control circuit 211, a high-frequency wave supply circuit 212, and at least one position detecting cell 201. The position detecting cell 201 includes a position detecting antenna 202 and a position detecting switch 203. As the position detecting switch 203, a transistor including an oxide semiconductor in a channel formation region is used. The position detecting switch 203 functions as a switch for controlling supply of a high-frequency wave to the position detecting antenna 202. One electrode (terminal) of a source electrode and a drain electrode of the position detecting switch 203 is connected to a wiring 206, and a gate electrode (control terminal) of the position detecting switch 203 is connected to a wiring 205. In addition, the other electrode (terminal) of the source electrode and the drain electrode of the position detecting switch 203 is connected to one electrode (terminal) of the position detecting antenna 202, and the other electrode (terminal) of the position detecting antenna 202 is connected to a potential detecting circuit 213.

The position detecting antenna 202 has a coil shape in this embodiment; however, the shape of the position detecting antenna 202 is not limited thereto, and may be determined as appropriate in consideration of a frequency of a high-frequency wave used for supplying power. Instead of a coiled antenna, a monopole antenna, a dipole antenna, a patch antenna, or the like can be used.

The wiring 205 is connected to the position detecting switch control circuit 211 and transmits a signal (potential) for turning on/off the position detecting switch 203 from the position detecting switch control circuit 211 to the control terminal of the position detecting switch 203. The high-frequency wave supply circuit 212 includes a high-frequency power supply generating a high-frequency wave and supplies a high-frequency wave to the position detecting antenna 202 through the wiring 206 and the position detecting switch 203.

The frequency of the high-frequency wave which the high-frequency wave supply circuit 212 supplies is not limited to a specific frequency, and for example, any of the following frequencies can be used: higher than or equal to 300 GHz and lower than 3 THz, which are frequencies of sub-millimeter waves; higher than or equal to 30 GHz and lower than 300 GHz, which are frequencies of millimeter waves; higher than or equal to 3 GHz and lower than 30 GHz, which are frequencies of microwaves; higher than or equal to 300 MHz and lower than 3 GHz, which are frequencies of ultrashort waves; higher than or equal to 30 MHz and lower than 300 MHz, which are frequencies of very short waves; higher than or equal to 3 MHz and lower than 30 MHz, which are frequencies of shortwaves; higher than or equal to 300 kHz and lower than 3 MHz, which are frequencies of medium waves; higher than or equal to 30 kHz and lower than 300 kHz, which are frequencies of long waves; and higher than or equal to 3 kHz and lower than 30 kHz, which are frequencies of very long waves.

Next, a method for detecting the power receiving device 120 by the position detecting device 200 is described. Detection of the power receiving device 120 by the position detecting device 200 is performed by detecting a change of the impedance of the position detecting cell 201 which is caused when the power receiving device 120 gets close to the position detecting device 200, as a potential change.

Specifically, first, a high-frequency wave (e.g., 3.5 MHz) is supplied from the high-frequency wave supply circuit 212 to the wiring 206 in a state where the power receiving device 120 is not placed over the intended position detecting cell 201 and a signal for turning on the position detecting switch 203 is transmitted from the position detecting switch control circuit 211 to the control terminal of the position detecting switch 203 through the wiring 205, whereby the position detecting switch 203 is turned on and the high-frequency wave is supplied to the position detecting antenna 202. The potential of a node 207 at this time is detected and stored by the potential detecting circuit 213.

When the power receiving device 120 gets close to the intended position detecting cell 201, apparent inductance of the position detecting antenna 202 is changed by the influence of the power receiving antenna 122 included in the power receiving device 120. That is, since impedance of the position detecting cell 201 is changed, the potential of the node 207 is also changed. By comparing the potential of the node 207 with the stored potential, it is possible to determine whether or not the power receiving device 120 is placed over the intended position detecting cell 201.

The impedance of the position detecting cell 201 gets larger as the frequency of a high-frequency wave used for position detection gets higher; thus, the potential change of the node 207 becomes also bigger. In other words, the higher the frequency of the high-frequency wave used for the position detection is, the more sensitively the position detection is performed. The frequency of the high-frequency wave used for the position detection is preferably higher than or equal to 1 MHz, more preferably higher than or equal to 3 MHz, still more preferably higher than or equal to 5 MHz. By using a high-frequency wave with a higher frequency, position detection can be performed quickly and accurately.

An OFET which is conventionally used as a position detecting switch has higher operation speed than a MEMS switch; however, it has been difficult to use a high-frequency wave with a frequency of higher than 5 MHz for position detection. A transistor including an oxide semiconductor in a channel formation region has higher field-effect mobility and higher operation speed than an OFET; therefore, the transistor including an oxide semiconductor in the channel formation region is used as the position detecting switch, so that a high-frequency wave with a higher frequency can be used for position detection.

Since the band gap of the oxide semiconductor is greater than or equal to 3 eV which is much wider than that of silicon, germanium, or the like, hot-carrier degradation is hardly caused; accordingly, a highly reliable position detecting device which can withstand long-term use can be provided.

In addition, in the transistor including an oxide semiconductor in the channel formation region, the off-state current per micrometer in channel width at room temperature can be less than or equal to 10 aA/μm ($1\times10^{-17}$ A/μm), less than or equal to 1 aA/μm ($1\times10^{-18}$ A/μm), further less than or equal to 1 zA/μm ($1\times10^{-21}$ A/μm), still further less than or equal to 1 yA/μm ($1\times10^{-24}$ A/μm). Therefore, when the transistor including an oxide semiconductor in the channel formation region is used as the position detecting switch, unnecessary output of a high-frequency wave to the position detecting antenna 202 can be prevented.

As the position detecting switch 203, a transistor including an inorganic semiconductor such as silicon (Si), germanium (Ge), or silicon carbide (SiC) in a channel formation region can be used; however, the transistor including an oxide semiconductor in the channel formation region, in which degradation is hardly caused and both high-speed operation and a smaller amount of off-state current can be realized, is preferably used.

As described above, the transistor including an oxide semiconductor in the channel formation region is used instead of an OFET as the position detecting switch 203 included in the position detecting device 200, so that the frequency of the high-frequency wave used for the position detection can be higher. As a result, a highly-reliable low-power-consumption power supply device which can realize quick and accurate position detection and can withstand long-term use can be provided.

This embodiment can be implemented in appropriate combination with any of the other embodiments.

Embodiment 3

In this embodiment, an example is described in which the power feeding switches and the position detecting switches which are described in Embodiments 1 and 2 are arranged in a matrix. The power feeding cells and/or the position detecting cells are arranged in a matrix to form an antenna sheet.

First, a structure of a conventional power supply device 500 and operation thereof are described with reference to FIGS. 3A and 3B. The conventional power supply device 500 illustrated in FIG. 3A includes a power feeding cell 501, a first high-frequency wave supply circuit 506, a second high-frequency wave supply circuit 508, a power feeding switch control circuit 511, a position detecting switch control circuit 512, and a potential detecting circuit 510.

The power feeding cell 501 has a coiled antenna 502 which is used for both power feeding and position detection. One electrode of the antenna 502 is connected to the first high-frequency wave supply circuit 506 for the power feeding through a power feeding switch 505 and to the second high-frequency wave supply circuit 508 for the position detection through a position detecting switch 507. A MEMS switch is used as the power feeding switch 505 and an OFET is used as the position detecting switch 507. The other electrode of the antenna 502 is connected to the potential detecting circuit 510. In addition, the antenna 502 and a capacitor 503 are connected in parallel.

Figure 3A:
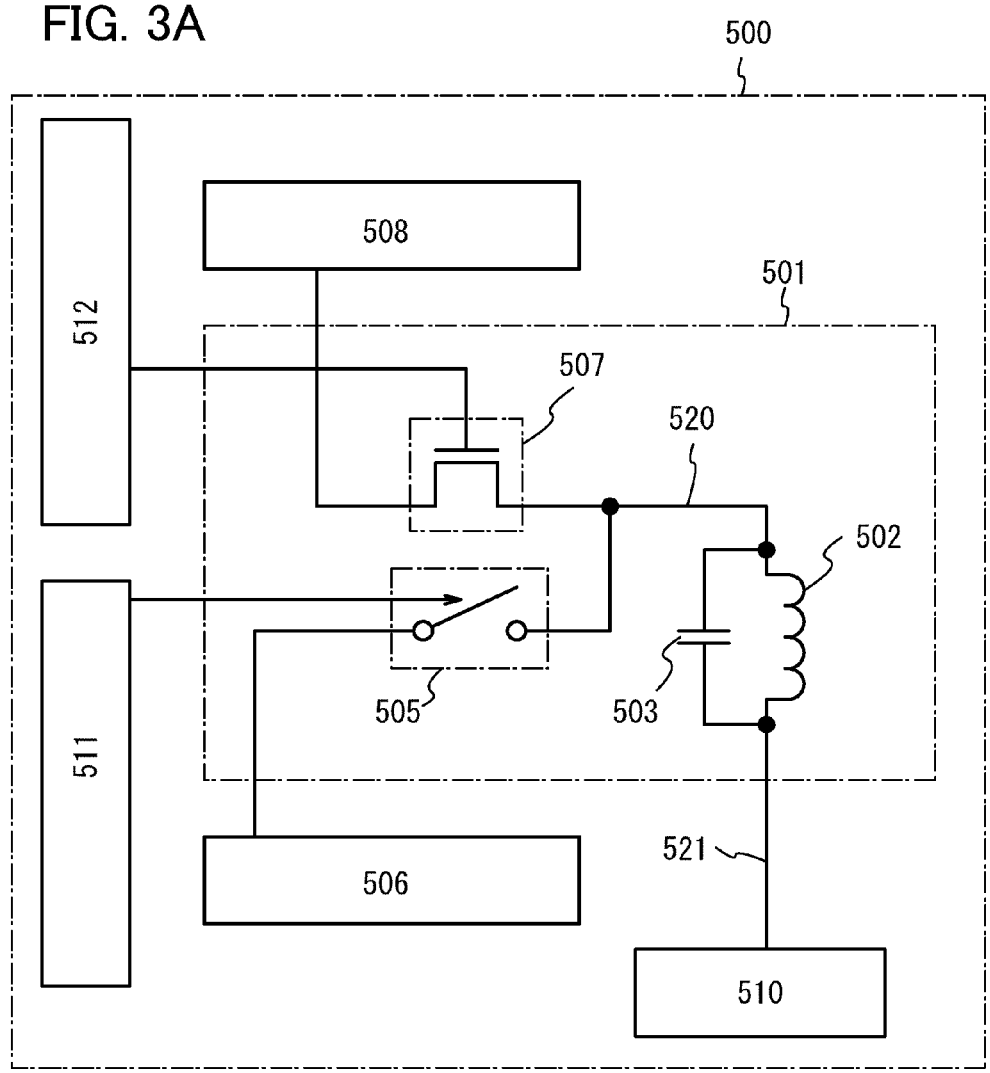
FIGS. 3A and 3B illustrate a conventional power supply device.
Figure 3B:
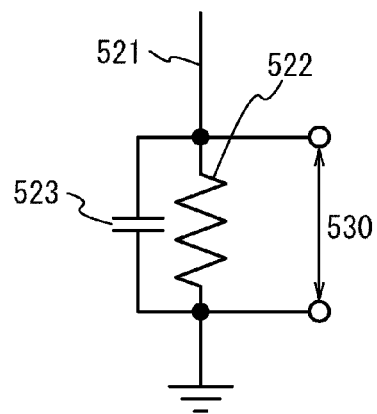

FIG. 3B shows an example of the potential detecting circuit 510. The potential detecting circuit 510 includes a resistor 522 and a capacitor 523. An example in which the resistor 522 and the capacitor 523 are connected in parallel is described.

On/off operation of the power feeding switch 505 is controlled by the power feeding switch control circuit 511. On/off operation of the position detecting switch 507 is controlled by the position detecting switch control circuit 512.

The first high-frequency wave supply circuit 506 and the second high-frequency wave supply circuit 508 each include a high-frequency power supply generating a high-frequency wave and supply a high-frequency wave to the antenna 502 through the power feeding switch 505 or the position detecting switch 507.

The frequency of the high-frequency wave supplied from the first high-frequency wave supply circuit 506 and the frequency of the high-frequency wave supplied from the second high-frequency wave supply circuit 508 are different. The first high-frequency wave supply circuit 506 supplies a high-frequency wave with a power feeding frequency (e.g., 13.56 MHz) and the second high-frequency wave supply circuit 508 supplies a high-frequency wave with a position detection frequency (e.g., 3.5 MHz). By using high-frequency waves with different frequencies, the power feeding and the position detection are performed at the same time.

For example, when position detection is performed during power feeding operation, the power feeding switch 505 and the position detecting switch 507 are turned on simultaneously, and then a high-frequency wave in which a high-frequency wave with a frequency of 13.56 MHz and a high-frequency wave with a frequency of 3.5 MHz are superimposed on each other is applied to a node 520.

By connecting the capacitor 503 and the antenna 502 in parallel to form an LC parallel resonance circuit, a high-frequency wave with a frequency of 13.56 MHz is taken out from the high-frequency wave in which the two high-frequency waves are superimposed on each other, and used for the power feeding. Further, the capacitor 523 and the resistor 522 included in the potential detecting circuit 510 are connected in parallel and a potential 530 or the potential of a node 521 is detected, so that the potential change of the high-frequency wave with a frequency of 3.5 MHz is detected.

Figure 4:
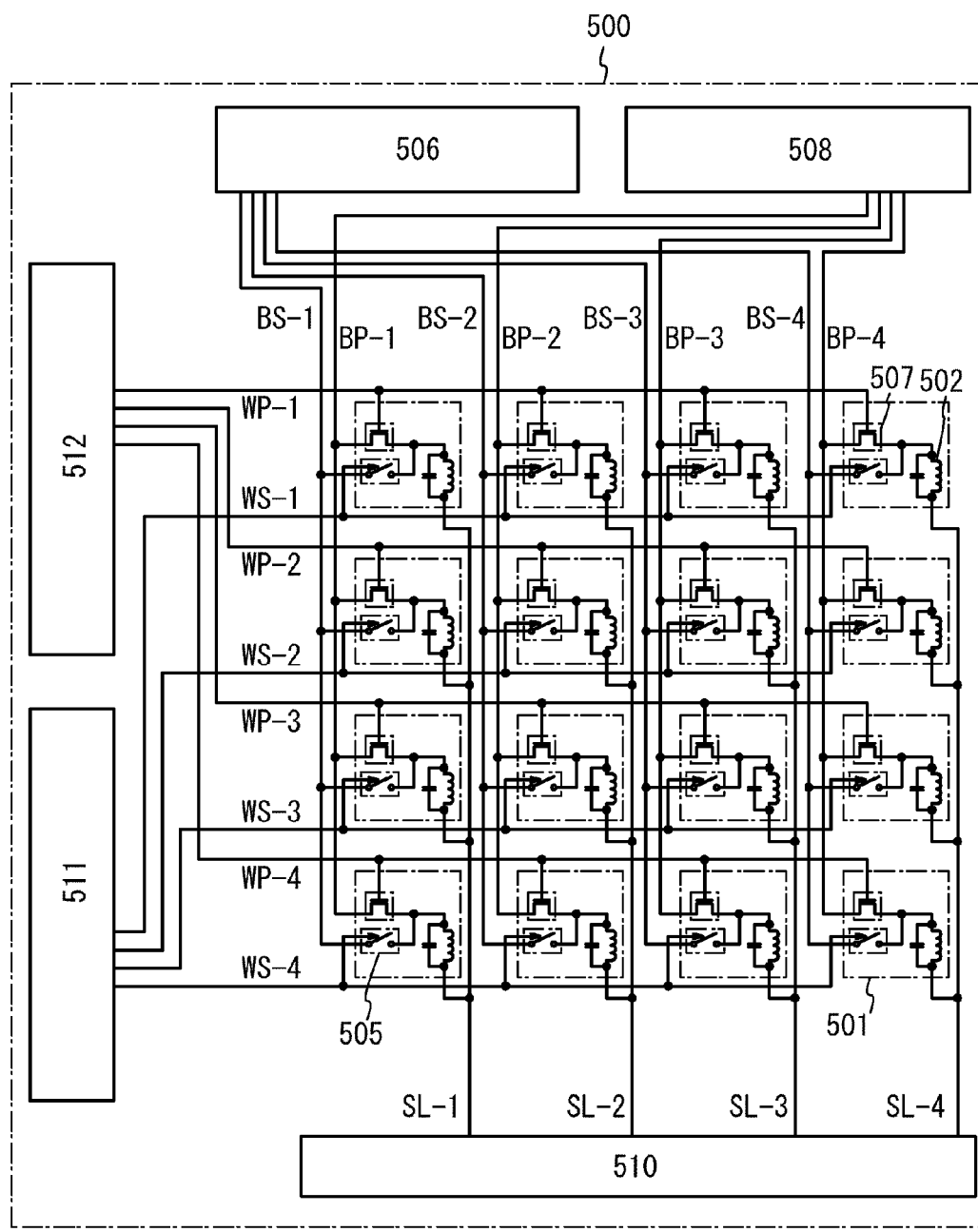
FIG. 4 illustrates a conventional power supply device.

FIG. 4 shows a conventional example in which the power feeding cells 501 illustrated in FIG. 3A are arranged in a matrix. In FIG. 4, the power supply device 500 in which 16 power feeding cells 501 are arranged in a matrix with 4 rows and 4 columns is illustrated.

In FIG. 4, gate electrodes of the position detecting switches 507 included in all the power feeding cells 501 in the first row are connected to WP-1; gate electrodes of the power feeding switches 505 included in all the power feeding cells 501 in the first row are connected to WS-1; one of a source electrode and a drain electrode of each of the position detecting switches 507 included in all the power feeding cells 501 in the first column is connected to BP-1; one of a source electrode and a drain electrode of each of the power feeding switches 505 included in all the power feeding cells 501 in the first column is connected to BS-1; and an electrode, which is not connected to the position detecting switch 507 and the power feeding switch 505, of each of the antennas 502 included in all the power feeding cells 501 in the first column is connected to SL-1.

In this manner, in FIG. 4, 16 power feeding cells 501 arranged in a matrix with 4 rows and 4 columns are connected to WP-1 to WP-4, WS-1 to WS-4, BP-1 to BP-4, BS-1 to BS-4, and SL-1 to SL-4. WP-1 to WP-4 are connected to the position detecting switch control circuit 512; WS-1 to WS-4 are connected to the power feeding switch control circuit 511; BP-1 to BP-4 are connected to the second high-frequency wave supply circuit 508; BS-1 to BS-4 are connected to the first high-frequency wave supply circuit 506; and SL-1 to SL-4 are connected to the potential detecting circuit 510.

Whether there is the power receiving device 120 which gets close to the power feeding cell 501 or not can be detected by the following operation (position detection operation). First, a potential for turning off the position detecting switches 507 is supplied to WP-2 to WP-4 and a potential for turning on the position detecting switches 507 is supplied to WP-1. A high-frequency wave with a position detection frequency (e.g., 3.5 MHz) is supplied to BS-1 to BS-4. Then, the potentials of SL-1 to SL-4 are detected.

Next, a potential for turning off the position detecting switches 507 is supplied to WP-1, WP-3, and WP-4, and a potential for turning on the position detecting switches 507 is supplied to WP-2. A high-frequency wave with a position detection frequency (e.g., 3.5 MHz) is supplied to BS-1 to BS-4. Then, the potentials of SL-1 to SL-4 are detected.

As described above, WP-1 to WP-4 are sequentially selected, whereby the position of the power feeding cell 501 to which the power receiving device 120 gets close can be detected (specified).

The power feeding switch 505 of the power feeding cell 501 the position of which is detected (specified) is turned on, and a high-frequency wave with a power feeding frequency (e.g., 13.56 MHz) is supplied from the first high-frequency wave supply circuit 506 (power feeding operation). When it is judged that the power receiving device 120 is away from the cell in the power feeding operation by the position detection operation, the power feeding switch 505 is turned off and supply of the power feeding high-frequency wave from the first high-frequency wave supply circuit 506 to the power feeding cell 501 is stopped. In this manner, the position detection operation and the power feeding operation are performed.

The power feeding switch 505 and the position detecting switch 507 each use a transistor including an oxide semiconductor in a channel formation region, so that a highly-reliable low-power-consumption power supply device which has excellent sensitivity for the position detection can be provided.

As described in Embodiment 1, the transistor including an oxide semiconductor in the channel formation region has low off-state current, and even when a large amount of current flows, hot-carrier degradation is hardly caused. Further, since there is no mechanical contact, the power feeding switch 505 is replaced with the transistor including an oxide semiconductor in the channel formation region, so that a highly-reliable low-power-consumption power supply device which can supply a large amount of power and can withstand long-term use can be provided.

In addition, as described in Embodiment 2, the transistor including an oxide semiconductor in the channel formation region has higher field-effect mobility and higher operation speed than an OFET; therefore, the position detecting switch 507 is replaced with the transistor including an oxide semiconductor in the channel formation region, so that a high-frequency wave with a higher frequency can be used for position detection and quick and accurate position detection can be conducted.

A transistor including an oxide semiconductor in a channel formation region has high operation speed because of its field-effect mobility which is higher than that of an OFET; therefore, even when the number of power feeding cells is large, the power feeding cell 501 over which the power receiving device 120 is placed can be detected (specified) quickly. Further, since a high-frequency wave with a higher frequency can be used for the position detection, more accurate position detection can be conducted.

Note that when the high-frequency wave with the power feeding frequency and the high-frequency wave with the position detection frequency have the same frequency, the power feeding operation and the position detection operation cannot be performed at the same time; therefore, different frequencies need to be used as the power feeding frequency and the position detection frequency. In addition, the frequency of the high-frequency position detection wave is preferably lower than that of the high-frequency power feeding wave.

Next, a structure in which by using the same transistor as a power feeding switch and a position detecting switch, one switch included in a power feeding cell serves as a power feeding one and a position detection one is described with reference to FIG. 5.

Figure 5:
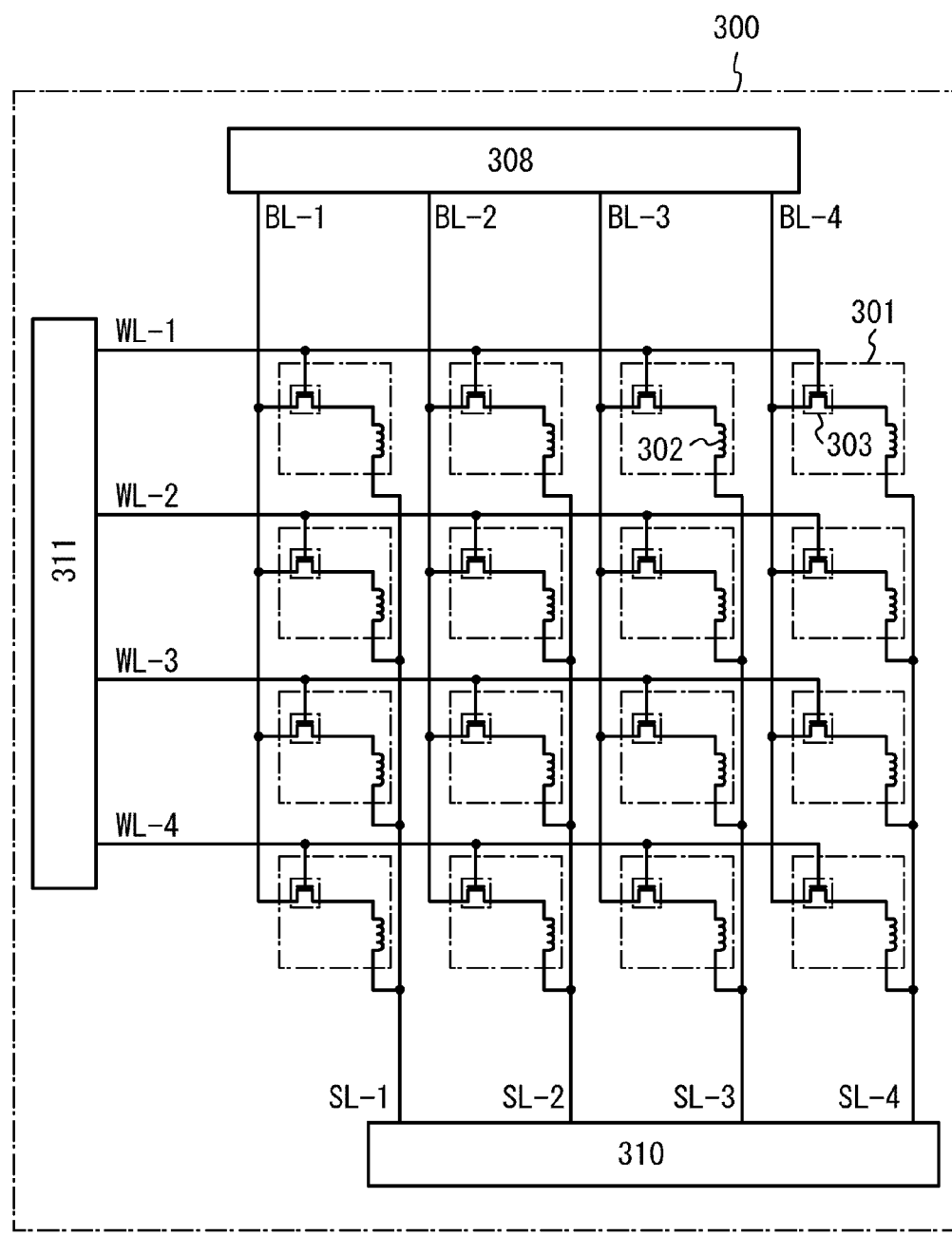
FIG. 5 illustrates a power supply device.

A cell 301 illustrated in FIG. 5 has a structure similar to that of the power feeding cell 101 described in Embodiment 1 and also functions as the position detecting cell described in Embodiment 2. That is, an antenna 302 in FIG. 5 functions as both the power feeding antenna and the position detecting antenna. Further, a switch 303 functions as both the power feeding switch and the position detecting switch.

A power supply device 300 in which 16 cells 301 are arranged in a matrix with 4 rows and 4 columns is illustrated in FIG. 5; however, the number and arrangement of cells 301 are not limited thereto and can be determined by a practitioner in consideration of an intended use.

In FIG. 5, gate electrodes of the switches 303 included in all the cells 301 in the first row are connected to WL-1; one of a source electrode and a drain electrode of each of the switches 303 included in all the cells 301 in the first column is connected to BL-1; and an electrode, which is not connected to the switch 303, of each of the antennas 302 included in all the cells 301 in the first column is connected to SL-1. Here, WL-1, BL-1, and SL-1 correspond to the wiring 105, the wiring 106, and the wiring 104 which are described in Embodiment 1, respectively (see FIG. 1A).

As described above, in FIG. 5, 16 cells 301 arranged in a matrix with 4 rows and 4 columns are connected to WL-1 to WL-4, BL-1 to BL-4, and SL-1 to SL-4. WL-1 to WL-4 are connected to a switch control circuit 311; BL-1 to BL-4 are connected to a high-frequency wave supply circuit 308; and SL-1 to SL-4 are connected to a potential detecting circuit 310.

The high-frequency wave supply circuit 308 includes a high-frequency power supply generating a high-frequency wave and supplies a high-frequency wave to the antenna 302 through the switch 303.

Power feeding from the power supply device 300 to the power receiving device 120 in power feeding operation is performed by the cell 301 to which the power receiving device 120 gets close, not by all the cells 301 at the same time. Note that power may be fed from a plurality of cells 301 or all the cells 301 depending on the number or the structure of the power receiving devices 120 which get close.

Since unnecessary power feeding can be reduced by limitation on power feeding from the cell 301 to which the power receiving device 120 does not get close, power consumption of the whole power supply device can be reduced and power feeding can be performed efficiently.

A transistor including an oxide semiconductor in a channel formation region can achieve low power consumption and can supply a large amount of power, and is a highly reliable transistor in which hot-carrier degradation is hardly caused. In addition, the transistor including an oxide semiconductor in the channel formation region has higher field-effect mobility and higher operation speed than an OFET. By using the transistor including an oxide semiconductor in the channel formation region, one transistor can serve as both the power feeding switch and the position detecting switch.

Further, in the transistor including an oxide semiconductor in the channel formation region, a high-frequency wave with a frequency of 5 MHz or higher can be used for position detection. Thus, in addition to low power consumption and high reliability, the high-frequency wave with the power feeding frequency and the high-frequency wave with the position detection frequency have the same frequency. As a result, high-frequency wave supply circuits which have been conventionally needed to be separately provided for the position detection and for the power feeding, can be one high-frequency wave supply circuit. Further, switch control circuits which have been needed to be separately provided for the position detection and for the power feeding can be one switch control circuit.

Furthermore, since the position detection and the power feeding can be performed by high-frequency waves with one frequency, a high-frequency wave does not need to be separated using a capacitor. Thus, the capacitor 503 and the capacitor 523 described in FIGS. 3A and 3B do not need to be provided. However, that may not be true if a capacitor is provided to remove noise components or the like.

In the case where the position detection operation and the power feeding operation are performed using high-frequency waves with one frequency, the power feeding operation needs to be stopped during the position detection operation. In the structure illustrated in FIG. 5, for example, the antennas 302 included in all the power feeding cells in the second column are all connected to SL-2; therefore, when the power receiving device is placed over any of the power feeding cells in the second column, it is detected that the power receiving device is placed over all the power feeding cells in the second column apparently. Accordingly, in the case where one transistor serves as both the power feeding switch and the position detecting switch, the position detection operation and the power feeding operation need to be alternately performed.

The position detection operation is performed in the following manner. First, from the switch control circuit 311, a signal for turning off the switches 303 is supplied to WL-2 to WL-4 and a signal for turning on the switches 303 is supplied to WL-1. A high-frequency wave with a specific frequency (e.g., 13.56 MHz) is supplied from the high-frequency wave supply circuit 308 to BL-1 to BL-4, and the potentials of SL-1 to SL-4 are detected.

Next, from the switch control circuit 311, a signal for turning off the switches 303 is supplied to WL-1, WL-3, and WL-4 and a signal for turning on the switches 303 is supplied to WL-2. A high-frequency wave with a specific frequency (e.g., 13.56 MHz) is supplied from the high-frequency wave supply circuit 308 to BL-1 to BL-4, and the potentials of SL-1 to SL-4 are detected.

In this manner, by scanning WL-1 to WL-4 sequentially, the position of the cell 301 over which the power receiving device 120 is placed can be detected (specified).

Note that the position detection operation is not operation for supplying power like power feeding operation, and by using a transistor including an oxide semiconductor in a channel formation region, the position detection frequency can be higher; therefore, the position detection operation can be performed with power smaller than power used for the power feeding operation. That is, a low-power consumption power supply device can be provided.

Then, the power feeding operation is performed. First, a high-frequency power feeding wave is supplied from the high-frequency wave supply circuit 308 to the cell 301 over which the power receiving device 120 is placed and which is detected by the position detection operation. Next, when a signal for turning on the switch 303 is supplied from the switch control circuit 311 to a control terminal of the switch 303 included in the cell 301, a high-frequency power feeding wave is supplied to the antenna 302 and power can be supplied to the power receiving device 120.

By using a transistor including an oxide semiconductor in a channel formation region as the switch 303, quick and accurate position detection operation can be performed; accordingly, a position detection operation period, namely, a suspension period of the power feeding operation can be shortened. A power feeding operation period is preferably longer than the position detection operation period. Further, it is more preferable that the power feeding operation period be 5 times or more the position detection operation period, preferably 10 times or more the position detection operation period, because the suspension period of the power feeding operation can be substantially regarded as being nonexistent.

As described above, when one transistor including an oxide semiconductor in a channel formation region serves as the power feeding switch and the position detecting switch, a circuit configuration becomes simple and the number of components can be reduced; accordingly, a power supply device with high productivity can be provided. Since the area occupied by a cell in which position detection and power feeding are performed can be reduced, a plurality of cells can be arranged with high density, so that spatial resolution in the position detection can be improved. Further, a highly-reliable low-power-consumption power supply device which can withstand long-term use can be provided.

Embodiment 4

In this embodiment, an example of a transistor that can be applied to a power supply device disclosed in this specification will be described.

There is no particular limitation on the structure of the transistor that can be applied to a power supply device disclosed in this specification; for example, a staggered type or a planar type having a top-gate structure or a bottom-gate structure can be employed. In addition, the transistor may have a single-gate structure in which one channel formation region is formed, a double-gate structure in which two channel formation regions are formed, or a triple-gate structure in which three channel formation regions are formed.

Note that FIGS. 6A to 6D and FIG. 7 each illustrate an example of a cross-sectional structure of a transistor. In one embodiment of the present invention, a conductive layer which faces a gate electrode of each of the transistors and is formed with a gate insulating layer, a semiconductor layer which is to be a channel formation region, and an insulating layer interposed therebetween, is used as a back gate electrode.

The transistors illustrated in FIGS. 6A to 6D and FIG. 7 each include an oxide semiconductor in the semiconductor layer which is to be a channel formation region. An advantage of using an oxide semiconductor is that high mobility and low off-state current can be obtained; however, another semiconductor may be used in accordance with the purpose or intended use.

Figure 6A:
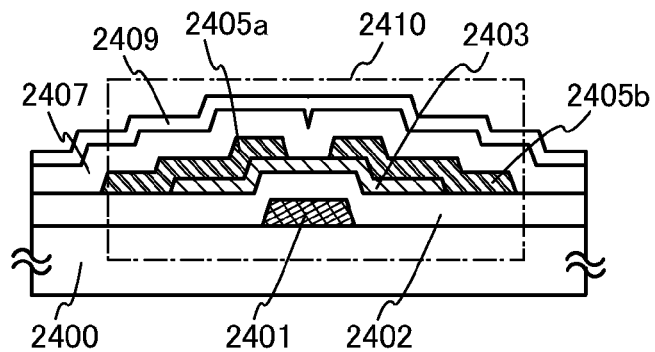
FIGS. 6A to 6D each illustrate an example of a structure of a transistor.

A transistor 2410 illustrated in FIG. 6A is one of bottom-gate transistors and is also called an inverted staggered transistor.

The transistor 2410 includes a gate electrode layer 2401, a gate insulating layer 2402, an oxide semiconductor layer 2403, a source electrode layer 2405*a*, and a drain electrode layer 2405*b*, which are formed over a substrate 2400 having an insulating surface. In addition, an insulating layer 2407 and a protective insulating layer 2409 are formed so as to cover them.

Figure 7:
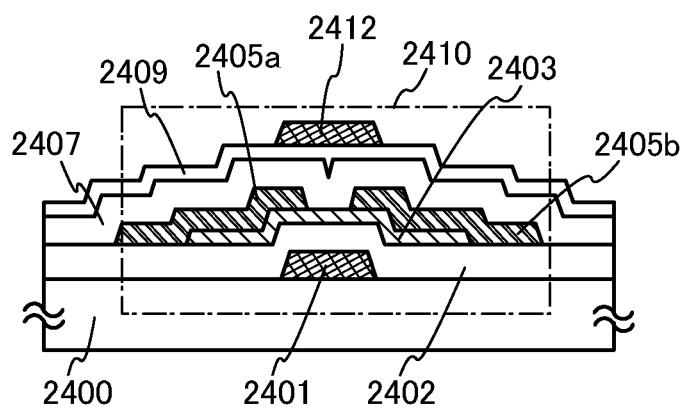
FIG. 7 illustrates an example of a structure of a transistor.

As illustrated in FIG. 7, a conductive layer 2412 may be formed over the insulating layer 2407 or the protective insulating layer 2409 of the transistor 2410 to overlap with a channel formation region. The conductive layer 2412 can be used as a back gate. By changing a potential of the back gate, the threshold voltage of the transistor can be changed. A similar structure can be applied to the following structure other than a top-gate structure.

Figure 6B:
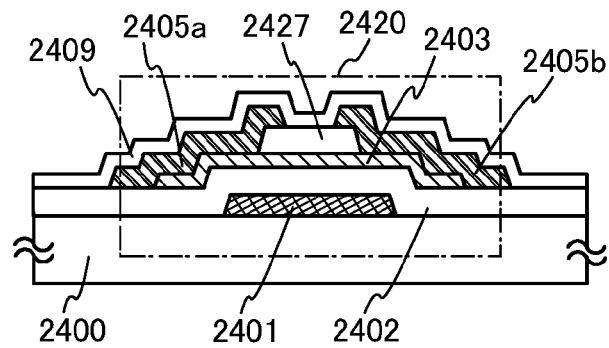

A transistor 2420 illustrated in FIG. 6B is one of bottom-gate transistors called a channel protective transistor and is also referred to as an inverted staggered transistor.

The transistor 2420 includes, over the substrate 2400 having an insulating surface, the gate electrode layer 2401, the gate insulating layer 2402, the oxide semiconductor layer 2403, an insulating layer 2427 functioning as a channel protective layer which covers a channel formation region of the oxide semiconductor layer 2403, the source electrode layer 2405a, and the drain electrode layer 2405b. The protective insulating layer 2409 is formed so as to cover them.

Figure 6C:
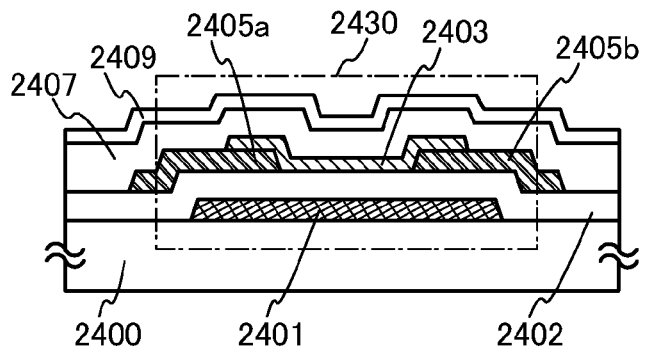

A transistor 2430 illustrated in FIG. 6C is a bottom-gate transistor includes the gate electrode layer 2401, the gate insulating layer 2402, the source electrode layer 2405a, the drain electrode layer 2405b, and the oxide semiconductor layer 2403, which are formed over the substrate 2400 having an insulating surface. The insulating layer 2407 and the protective insulating layer 2409 are formed so as to cover them.

In the transistor 2430, the gate insulating layer 2402 is provided over and in contact with the substrate 2400 and the gate electrode layer 2401, and the source electrode layer 2405a and the drain electrode layer 2405b are provided over and in contact with the gate insulating layer 2402. Further, the oxide semiconductor layer 2403 is provided over the gate insulating layer 2402, the source electrode layer 2405a, and the drain electrode layer 2405b.

Figure 6D:
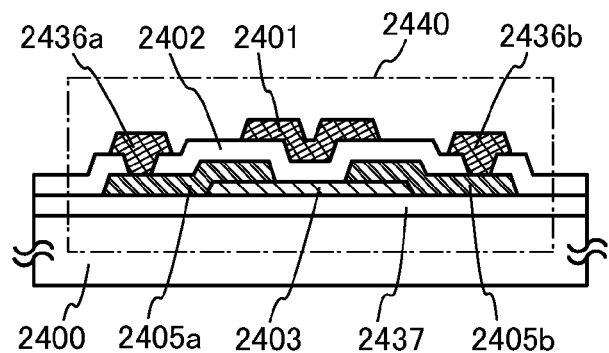

A transistor 2440 illustrated in FIG. 6D is one of top-gate transistors. In the transistor 2440, an insulating layer 2437, the oxide semiconductor layer 2403, the source electrode layer 2405a, the drain electrode layer 2405b, the gate insulating layer 2402, and the gate electrode layer 2401 are formed over the substrate 2400 having an insulating surface. A wiring layer 2436a and a wiring layer 2436b are connected to the source electrode layer 2405a and the drain electrode layer 2405b, respectively. In order to provide a back gate in this structure, a conductive layer and an insulating layer are formed in a region overlapping with the channel formation region before the oxide semiconductor layer 2403 is formed.

In this embodiment, the oxide semiconductor layer 2403 is used as a semiconductor layer in which a channel is formed as described above. As an oxide semiconductor material used for the oxide semiconductor layer 2403, any of the following metal oxides can be used: an In—Sn—Ga—Zn—O-based metal oxide which is a four-component metal oxide; an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, and a Sn—Al—Zn—O-based metal oxide which are three-component metal oxides; an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, and an In—Ga—O-based metal oxide which are two-component metal oxides; an In—O-based metal oxide, a Sn—O-based metal oxide, and a Zn—O-based metal oxide which are single-component metal oxides; and the like. Further, $SiO_2$ may be contained in the above oxide semiconductor. Here, for example, an In—Ga—Zn—O-based oxide semiconductor is an oxide containing at least In, Ga, and Zn, and there is no particular limitation on the composition ratio thereof. Further, the In—Ga—Zn—O-based oxide semiconductor may contain an element other than In, Ga, and Zn.

For the oxide semiconductor layer 2403, a thin film represented by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

In the transistors 2410, 2420, 2430, and 2440 each including the oxide semiconductor layer 2403 as the semiconductor layer in which a channel is formed, the current value in an off state (off-state current value) can be small. Accordingly, power consumption can be suppressed.

In addition, the transistors 2410, 2420, 2430, and 2440 each including the oxide semiconductor layer 2403 as the semiconductor layer in which the channel is formed can operate at high speed because they can achieve relatively high field-effect mobility. Thus, a driver circuit for which high-speed operation is required, such as the potential detecting circuit 310, the switch control circuit 311, or the high-frequency wave supply circuit 308 can be formed over the same substrate as the switch 303; therefore, the number of components can be reduced.

As the substrate 2400, as well as a glass substrate, a ceramic substrate, a quartz substrate, or a sapphire substrate, a crystallized glass substrate or the like can be used.

Alternatively, a flexible substrate may be used as the substrate 2400. In the case of using a flexible substrate, a transistor including an oxide semiconductor in a channel formation region may be directly formed on the flexible substrate; or a transistor including an oxide semiconductor in a channel formation region may be formed over another manufacturing substrate, and then may be separated from the manufacturing substrate and transferred to a flexible substrate. Note that in order to separate the transistor from the manufacturing substrate and transfer it to the flexible substrate, a separation layer is preferably provided between the manufacturing substrate and the transistor including an oxide semiconductor in the channel formation region.

In order to manufacture a flexible power supply device, a transistor including the oxide semiconductor layer 2403 in a channel formation region may be directly formed on a flexible substrate; or a transistor including the oxide semiconductor layer 2403 in a channel formation region may be formed over another manufacturing substrate, and then may be separated from the manufacturing substrate and transferred to a flexible substrate. Note that in order to separate the transistor from the manufacturing substrate and transfer it to the flexible substrate, a separation layer is preferably provided between the manufacturing substrate and the transistor including an oxide semiconductor in the channel formation region.

In the bottom-gate transistors 2410, 2420, and 2430, an insulating layer serving as a base layer may be provided between the substrate and the gate electrode layer. The base layer has a function of preventing diffusion of an impurity element from the substrate, and can be formed to have a single-layer structure or a stacked-layer structure using one or more layers selected from a silicon nitride layer, a silicon oxide layer, a silicon nitride oxide layer, and a silicon oxynitride layer.

When a halogen element such as chlorine or fluorine is contained in the base insulating layer, a function of preventing diffusion of an impurity element from the substrate 2400 can be further improved. The peak of the concentration of a halogen element to be contained in the base insulating layer is measured by secondary ion mass spectrometry (SIMS) and is preferably in the range of $1 \times 10^{15}/cm^3$ to $1 \times 10^{20}/cm^3$ inclusive.

For the gate electrode layer 2401, a metal material such as molybdenum (Mo), titanium (Ti), chromium (Cr), tantalum (Ta), tungsten (W), aluminum (Al), copper (Cu), neodymium (Nd), scandium (Sc), or magnesium (Mg), or an alloy material which contains any of these materials as its main component can be used. In addition, the gate electrode layer 2401 is not limited to a single layer, and a stacked layer of different layers may also be used.

The gate insulating layer 2402 can be formed using silicon oxide, silicon nitride, silicon oxynitride, silicon nitride oxide, aluminum oxide, aluminum nitride, aluminum oxynitride, aluminum nitride oxide, tantalum oxide, yttrium oxide, hafnium oxide, hafnium silicate (HfSi$_x$O$_y$ O$_y$ (x>0, y>0)), hafnium silicate to which nitrogen is added (HfSi$_x$O$_y$N$_z$ (x>0, y>0, z>0)), hafnium aluminate to which nitrogen is added (HfAl$_x$O$_y$N$_z$ (x>0, y>0, z>0)), or the like. A plasma CVD method, a sputtering method, or the like can be employed. The gate insulating layer 2402 is not limited to a single layer, and a stacked layer of different layers may also be used. For example, by a plasma CVD method, a silicon nitride layer (SiN$_y$ (y>0)) may be formed as a first gate insulating layer, and a silicon oxide layer (SiO$_x$ (x>0)) may be formed as a second gate insulating layer over the first gate insulating layer, so that the gate insulating layer may be formed.

As the conductive layer used for the source electrode layer 2405a and the drain electrode layer 2405b, for example, a layer including an element selected from Al, Cr, Cu, Ta, Ti, Mo, W, and Mg, a layer including an alloy containing any of these elements, or the like can be used. Further, a structure may be employed in which a high-melting-point metal layer of Ti, Mo, W, or the like is stacked over and/or below a metal layer of Al, Cu, or the like. An aluminum material to which an element (Si, Nd, Sc, or the like) preventing generation of a hillock or a whisker in an aluminum layer is added is used, whereby heat resistance can be increased.

A material similar to that of the source electrode layer 2405a and the drain electrode layer 2405b can be used for a conductive layer such as the wiring layer 2436a and the wiring layer 2436b which are connected to the source electrode layer 2405a and the drain electrode layer 2405b, respectively.

Alternatively, the conductive layer to be the source electrode layer 2405a and the drain electrode layer 2405b (including a wiring layer formed using the same layer as the source and drain electrode layers) may be formed using a conductive metal oxide. As the conductive metal oxide, indium oxide (In$_2$O$_3$), tin oxide (SnO$_2$), zinc oxide (ZnO), an alloy of indium oxide and tin oxide (In$_2$O$_3$—SnO$_2$, abbreviated to ITO), an alloy of indium oxide and zinc oxide (In$_2$O$_3$—ZnO), or any of these metal oxide materials containing silicon oxide can be used.

As the insulating layers 2407, 2427, and 2437, an inorganic insulating layer such as a silicon oxide layer, a silicon oxynitride layer, an aluminum oxide layer, or an aluminum oxynitride layer can be typically used.

As the protective insulating layer 2409, an inorganic insulating layer such as a silicon nitride layer, a silicon nitride oxide layer, an aluminum oxide layer, an aluminum nitride layer, or an aluminum nitride oxide layer can be used.

A planarization insulating layer may be formed over the protective insulating layer 2409 in order to reduce surface unevenness caused by the structure of the transistor. For the planarization insulating layer, an organic material such as polyimide, an acrylic resin, or a benzocyclobutene-based resin can be used. As an alternative to such organic materials, it is possible to use a low-dielectric constant material (a low-k material) or the like. Note that the planarization insulating layer may be formed by stacking a plurality of insulating layers formed using these materials.

As described above, in this embodiment, a high-performance power supply device can be provided by using a transistor including an oxide semiconductor in a channel formation region.

This embodiment can be implemented in appropriate combination with any of the structures described in the other embodiments.

Embodiment 5

In this embodiment, an example of a transistor including an oxide semiconductor in a channel formation region and an example of a method for manufacturing the transistor will be described in detail with reference to the drawings.

FIGS. 8A to 8E illustrate an example of a cross-sectional structure of a transistor. A transistor 2510 illustrated in FIGS. 8A to 8E is an inverted staggered transistor having a bottom-gate structure, which is similar to the transistor 2410 illustrated in FIG. 6A.

An oxide semiconductor used for a semiconductor layer in this embodiment is an i-type (intrinsic) oxide semiconductor or a substantially i-type (intrinsic) oxide semiconductor. The i-type (intrinsic) oxide semiconductor or substantially i-type (intrinsic) oxide semiconductor is obtained in such a manner that hydrogen, which serves as a donor, is removed from an oxide semiconductor as much as possible, and the oxide semiconductor is highly purified so as to contain impurities that are not main components of the oxide semiconductor as few as possible. In other words, a feature is that a highly purified i-type (intrinsic) semiconductor or a semiconductor close thereto is obtained not by adding impurities but by removing impurities such as hydrogen and water as much as possible. Accordingly, the oxide semiconductor layer used in a channel formation region included in the transistor 2510 is an oxide semiconductor layer which is highly purified and made to be electrically i-type (intrinsic).

In addition, the highly purified oxide semiconductor includes extremely few (close to zero) carriers, and the carrier concentration is lower than $1\times10^{14}$/cm$^3$, preferably lower than $1\times10^{12}$/cm$^3$, more preferably lower than $1\times10^{11}$/cm$^3$.

Since the number of carriers in the oxide semiconductor is extremely small, off-state current can be reduced in the transistor. It is preferable that the off-state current be as small as possible.

Specifically, in the transistor including the above oxide semiconductor in the channel formation region, the off-state current value per micrometer of channel width at room temperature can be less than or equal to 10 aA/μm ($1\times10^{-17}$ A/μm), less than or equal to 1 aA/μm ($1\times10^{-18}$ A/μm), further less than or equal to 1 zA/μm ($1\times10^{-21}$ A/μm), still further less than or equal to 1 yA/μm ($1\times10^{-24}$ A/μm).

In addition, on-state current of the transistor 2510 including the above oxide semiconductor in the channel formation region has almost no temperature dependence, and the variations in off-state current are extremely small.

A process of manufacturing the transistor 2510 over a substrate 2505 is described below with reference to FIGS. 8A to 8E.

First, a conductive layer is formed over the substrate 2505 having an insulating surface, and then, a gate electrode layer 2511 is formed through a first photolithography step and an etching step. Note that a resist mask may be formed by an inkjet method. Formation of the resist mask by an inkjet method needs no photomask; thus, manufacturing cost can be reduced.

As the substrate 2505 having an insulating surface, a substrate similar to the substrate 2400 described in Embodiment 4 can be used. In this embodiment, a glass substrate is used as the substrate 2505.

An insulating layer serving as a base layer may be provided between the substrate 2505 and the gate electrode layer 2511. The base layer has a function of preventing diffusion of an impurity element from the substrate 2505, and can be formed to have a single-layer structure or a stacked-layer structure using one or more of a silicon nitride layer, a silicon oxide layer, a silicon nitride oxide layer, and a silicon oxynitride layer.

As the gate electrode layer 2511, a metal material such as molybdenum, titanium, tantalum, tungsten, aluminum, copper, neodymium, scandium, or magnesium or an alloy material which contains any of these materials as its main component can be used. In addition, the gate electrode layer 2511 is not limited to a single layer, and a stacked layer of different layers may also be used.

Next, a gate insulating layer 2507 is formed over the gate electrode layer 2511. The gate insulating layer 2507 preferably has a single-layer structure or a stacked-layer structure using a film including silicon oxide, silicon nitride, silicon oxynitride, silicon nitride oxide, aluminum oxide, aluminum nitride, aluminum oxynitride, aluminum nitride oxide, tantalum oxide, yttrium oxide, hafnium oxide, hafnium silicate ($HfSi_xO_y$ (x>0, y>0)), hafnium silicate to which nitrogen is added ($HfSi_xO_yN_z$ (x>0, y>0, z>0)), hafnium aluminate to which nitrogen is added ($HfAl_xO_yN_z$ (x>0, y>0, z>0)), or the like which is obtained by a CVD method, a sputtering method, or the like. The thickness of the gate insulating layer 2507 can be, for example, greater than or equal to 1 nm and less than or equal to 200 nm, preferably greater than or equal to 10 nm and less than or equal to 100 nm.

For the oxide semiconductor in this embodiment, an oxide semiconductor which is made to be an i-type semiconductor or a substantially i-type semiconductor by removal of impurities is used. Such a highly purified oxide semiconductor is highly sensitive to an interface state or interface charge; thus, an interface between the oxide semiconductor layer and the gate insulating layer is important. For that reason, the gate insulating layer that is in contact with a highly purified oxide semiconductor needs to have high quality.

For example, high-density plasma CVD using microwaves (e.g., a frequency of 2.45 GHz) is preferable because a dense high-quality insulating layer having high withstand voltage can be formed. The highly purified oxide semiconductor and the high-quality gate insulating layer are in close contact with each other, whereby the interface state can be reduced and favorable interface characteristics can be obtained.

Needless to say, another film formation method such as a sputtering method or a plasma CVD method can be employed as long as the method enables formation of a high-quality insulating layer as a gate insulating layer. Further, an insulating layer whose film quality and characteristic of the interface with an oxide semiconductor are improved by heat treatment performed after formation of the insulating layer may be formed as a gate insulating layer. In any case, an insulating layer that can reduce interface state density with an oxide semiconductor to form a favorable interface, as well as having favorable film quality as the gate insulating layer, is formed. An example of using a sputtering method is described here.

In order that hydrogen, hydroxyl, and moisture might be contained in the gate insulating layer 2507 and an oxide semiconductor layer 2530 as little as possible, it is preferable that the substrate 2505 over which the gate electrode layer 2511 is formed or the substrate 2505 over which layers up to the gate insulating layer 2507 are formed be preheated in a preheating chamber of a sputtering apparatus as pretreatment for deposition of the oxide semiconductor layer 2530 so that impurities such as hydrogen and moisture adsorbed on the substrate 2505 are eliminated and removed. As an evacuation unit provided for the preheating chamber, a cryopump is preferable. Note that this preheating treatment can be omitted. This preheating treatment may be similarly performed on the substrate 2505 over which layers up to a source electrode layer 2515a and a drain electrode layer 2515b are formed before formation of an insulating layer 2516.

Figure 8A:
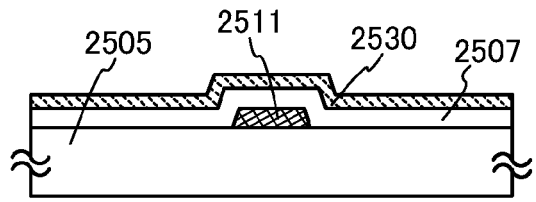
FIGS. 8A to 8E illustrate a manufacturing process of a transistor.
Figure 8B:
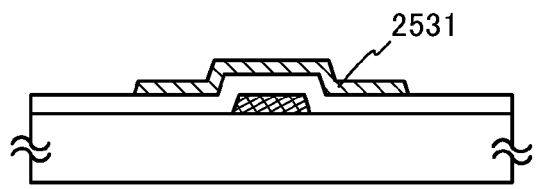
Figure 8C:
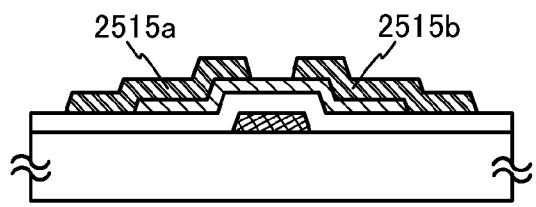

Next, the oxide semiconductor layer 2530 having a thickness of greater than or equal to 2 nm and less than or equal to 200 nm, preferably greater than or equal to 5 nm and less than or equal to 30 nm is formed over the gate insulating layer 2507 (see FIG. 8A).

Note that before the oxide semiconductor layer 2530 is formed by a sputtering method, powder substances (also referred to as particles or dust) attached on a surface of the gate insulating layer 2507 are preferably removed by reverse sputtering in which an argon gas is introduced and plasma is generated. The reverse sputtering refers to a method in which, without application of voltage to a target side, an RF power supply is used for application of voltage to a substrate side in an argon atmosphere so that plasma is generated in the vicinity of the substrate to modify a surface. Note that instead of an argon atmosphere, a nitrogen atmosphere, a helium atmosphere, an oxygen atmosphere, or the like may be used.

As an oxide semiconductor used for the oxide semiconductor layer 2530, an oxide semiconductor described in Embodiment 4, such as a four-component metal oxide, a three-component metal oxide, a two-component metal oxide, or a single-component metal oxide such as an In—O-based metal oxide, a Sn—O-based metal oxide, or a Zn—O-based metal oxide can be used. Further, $SiO_2$ may be contained in the above oxide semiconductor. In this embodiment, the oxide semiconductor layer 2530 is formed by a sputtering method with the use of an In—Ga—Zn—O-based oxide target. A cross-sectional view at this stage corresponds to FIG. 8A. Alternatively, the oxide semiconductor layer 2530 can be formed by a sputtering method in a rare gas (typically, argon) atmosphere, an oxygen atmosphere, or a mixed atmosphere containing a rare gas and oxygen.

As a target for forming the oxide semiconductor layer 2530 by a sputtering method, for example, a target having a composition ratio of $In_2O_3:Ga_2O_3:ZnO=1:1:1$ [molar ratio] (that is, In:Ga:Zn=1:1:0.5 [atomic ratio]) can be used. Alternatively, a target having a composition ratio of $In_2O_3:Ga_2O_3:ZnO=1:1:2$ [molar ratio], $In_2O_3:Ga_2O_3:ZnO=2:2:1$ [molar ratio], or $In_2O_3:Ga_2O_3:ZnO=1:1:4$ [molar ratio] may be used. Further alternatively, a target having a composition ratio of $In_2O_3:Ga_2O_3:ZnO=2:0:1$ [molar ratio] may be used.

When an In—Zn—O-based material is used as the oxide semiconductor, a target to be used has a composition ratio of In:Zn=50:1 to 1:2 in an atomic ratio ($In_2O_3:ZnO=25:1$ to 1:4 in a molar ratio), preferably In:Zn=20:1 to 1:1 in an atomic ratio ($In_2O_3:ZnO=10:1$ to 1:2 in a molar ratio), more preferably In:Zn=15:1 to 1.5:1 in an atomic ratio ($In_2O_3:ZnO=15:2$ to 3:4 in a molar ratio). For example, in a target used for formation of an In—Zn—O-based oxide semiconductor which has an atomic ratio of In:Zn:O=X:Y:Z, an inequality of $Z>1.5X+Y$ is satisfied.

The filling rate of such a target is higher than or equal to 90% and lower than or equal to 100%, preferably higher than or equal to 95% and lower than or equal to 99.9%. With the use of the metal oxide target with high filling rate, the deposited oxide semiconductor layer has high density.

It is preferable that a high-purity gas from which impurities such as hydrogen, water, hydroxyl, and hydride are removed be used as a sputtering gas for the deposition of the oxide semiconductor layer 2530.

The substrate is held in a deposition chamber under reduced pressure, and the substrate temperature is set to higher than or equal to 100° C. and lower than or equal to 600° C., preferably higher than or equal to 200° C. and lower than or equal to 400° C. Deposition is performed while the substrate is heated, whereby the impurity concentration in the oxide semiconductor layer formed can be reduced. Moreover, damage to the oxide semiconductor layer due to sputtering is reduced. The oxide semiconductor layer 2530 is formed over the substrate 2505 in such a manner that a sputtering gas from which hydrogen and moisture have been removed is introduced into the deposition chamber while moisture remaining therein is removed, and the above-described target is used. In order to remove moisture remaining in the deposition chamber, an entrapment vacuum pump, for example, a cryopump, an ion pump, or a titanium sublimation pump is preferably used. Further, an evacuation unit may be a turbo molecular pump provided with a cold trap. In the deposition chamber which is evacuated with the cryopump, a hydrogen atom, a compound containing a hydrogen atom such as water ($H_2O$), (more preferably, also a compound containing a carbon atom), and the like are removed, whereby the impurity concentration in the oxide semiconductor layer formed in the deposition chamber can be reduced.

As one example of the deposition condition, the distance between the substrate and the target is 100 mm, the pressure is 0.6 Pa, the direct-current (DC) power is 0.5 kW, and the atmosphere is an oxygen atmosphere (the proportion of the oxygen flow rate is 100%). Note that a pulse direct-current power supply is preferable because powder substances (also referred to as particles or dust) generated in deposition can be reduced and the film thickness can be uniform.

Then, the oxide semiconductor layer 2530 is processed into an island-shaped oxide semiconductor layer by a second photolithography step and an etching step. A resist mask for forming the island-shaped oxide semiconductor layer may be formed by an inkjet method. Formation of the resist mask by an inkjet method needs no photomask; thus, manufacturing cost can be reduced.

In the case where a contact hole is formed in the gate insulating layer 2507, the formation of the contact hole can be performed at the same time as processing of the oxide semiconductor layer 2530.

Note that the etching of the oxide semiconductor layer 2530 may be dry etching, wet etching, or both dry etching and wet etching. As an etchant used for wet etching of the oxide semiconductor layer 2530, for example, a mixed solution of phosphoric acid, acetic acid, and nitric acid, ITO-07N (produced by KANTO CHEMICAL CO., INC.), or the like can be used.

Next, the oxide semiconductor layer is subjected to first heat treatment. The oxide semiconductor layer can be dehydrated or dehydrogenated by this first heat treatment. The first heat treatment is performed at a temperature higher than or equal to 400° C. and lower than or equal to 750° C., alternatively, higher than or equal to 400° C. and lower than the strain point of the substrate in an atmosphere of nitrogen or a rare gas such as helium, neon, or argon. Here, the substrate is introduced into an electric furnace which is one of heat treatment apparatuses, and heat treatment is performed on the oxide semiconductor layer at 450° C. for 1 hour in a nitrogen atmosphere; thus, a dehydrated or dehydrogenated oxide semiconductor layer 2531 is formed (see FIG. 8B).

Note that a heat treatment apparatus is not limited to an electric furnace, and may be provided with a device for heating an object to be processed by heat conduction or heat radiation from a heating element such as a resistance heating element. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high temperature gas, an inert gas which does not react with an object to be processed by heat treatment, such as nitrogen or a rare gas like argon, is used.

For example, as the first heat treatment, GRTA by which the substrate is moved into an inert gas heated at a temperature of 650° C. to 700° C. inclusive, heated for several minutes, and moved out of the inert gas heated to the high temperature may be performed.

Note that in the first heat treatment, it is preferable that water, hydrogen, and the like be not contained in an inert gas which is introduced into the heat treatment apparatus. Alternatively, the purity of the inert gas is preferably 6N (99.9999%) or higher, preferably 7N (99.99999%) or higher (that is, the impurity concentration is 1 ppm or lower, preferably 0.1 ppm or lower).

Further, after the oxide semiconductor layer is heated through the first heat treatment, a high-purity oxygen gas, a high-purity $N_2O$ gas, or an ultra-dry air (the dew point is lower than or equal to −40° C., preferably lower than or equal to −60° C.) may be introduced into the same furnace. The purity of an oxygen gas or an $N_2O$ gas which is introduced into the heat treatment apparatus is preferably 6N or higher, more preferably 7N or higher (that is, the impurity concentration in the oxygen gas or the $N_2O$ gas is 1 ppm or lower, preferably 0.1 ppm or lower). It is preferable that water, hydrogen, and the like be not contained in these gases in particular. By the action of the oxygen gas or the $N_2O$ gas, oxygen which is a main component of the oxide semiconductor and which has been eliminated at the same time as the step for removing impurities by dehydration or dehydrogenation can be supplied. Through this step, the oxide semiconductor layer can be highly purified and made to be an electrically i-type (intrinsic) oxide semiconductor.

The first heat treatment for the oxide semiconductor layer can be performed on the oxide semiconductor layer 2530 that has not been processed into the island-shaped oxide semiconductor layer. In that case, the substrate is taken out of the heat treatment apparatus after the first heat treatment, and then a photolithography step is performed.

Note that the first heat treatment may be performed at any of the following timings in addition to the above timing as long as it is performed after deposition of the oxide semiconductor layer: after the source electrode layer and the drain electrode layer are formed over the oxide semiconductor layer; and after the insulating layer is formed over the source electrode layer and the drain electrode layer.

Further, in the case where a contact hole is formed in the gate insulating layer 2507, the formation of the contact hole may be performed either before or after the first heat treatment is performed on the oxide semiconductor layer 2530.

Further, an oxide semiconductor layer formed in the following manner may also be used: an oxide semiconductor is deposited twice, and heat treatment is performed thereon twice. Through such steps, a crystal region (a single crystal region) which is c-axis-aligned perpendicularly to a surface of the film and has a large thickness can be formed without depending on a base component.

For example, a first oxide semiconductor layer with a thickness of greater than or equal to 3 nm and less than or equal to 15 nm is deposited, and first heat treatment is performed in a nitrogen atmosphere, an oxygen atmosphere, a rare gas atmosphere, or a dry air atmosphere at a temperature higher than or equal to 450° C. and lower than or equal to 850° C., preferably higher than or equal to 550° C. and lower than or equal to 750° C., so that a first oxide semiconductor layer having a crystal region (including a plate-like crystal) in a region including a surface is formed. Then, a second oxide semiconductor layer which has a larger thickness than the first oxide semiconductor layer is formed, and second heat treatment is performed at a temperature higher than or equal to 450° C. and lower than or equal to 850° C., preferably higher than or equal to 600° C. and lower than or equal to 700° C.

Through such steps, in the entire second oxide semiconductor layer, crystal growth can proceed from the lower part to the upper part using the first oxide semiconductor layer as a seed crystal, whereby an oxide semiconductor layer having a thick crystal region can be formed.

Next, a conductive layer to be the source electrode layer and the drain electrode layer (including a wiring layer formed using the same layer as the source and drain electrode layers) is formed over the gate insulating layer 2507 and the oxide semiconductor layer 2531. As the conductive layer serving as the source and drain electrode layers, a material similar to that used for the source electrode layer 2405a and the drain electrode layer 2405b which is described in Embodiment 4 can be used.

A resist mask is formed over the conductive layer in a third photolithography step and selective etching is performed, so that the source electrode layer 2515a and the drain electrode layer 2515b are formed. Then, the resist mask is removed (see FIG. 8C).

Light exposure at the time of the formation of the resist mask in the third photolithography step may be performed using ultraviolet light, KrF laser light, or ArF laser light. The channel length L of the transistor that is formed later is determined by a distance between bottom end portions of the source electrode layer and the drain electrode layer, which are adjacent to each other over the oxide semiconductor layer 2531. In the case where the channel length L is less than 25 nm, the light exposure at the time of the formation of the resist mask in the third photolithography step may be performed using extreme ultraviolet light having an extremely short wavelength of several nanometers to several tens of nanometers. Light exposure with extreme ultraviolet light leads to a high resolution and a large depth of focus. Thus, the channel length L of the transistor to be formed later can be greater than or equal to 10 nm and less than or equal to 1000 nm and the operation speed of a circuit can be increased, and furthermore the off-state current value is extremely small, and thus lower power consumption can be achieved.

In order to reduce the number of photomasks and steps in the photolithography step, the etching step may be performed using a resist mask formed by a multi-tone mask. Since light which passes through the multi-tone mask has a plurality of intensity levels, a resist mask which partly has a different thickness can be formed. The resist mask can be changed in shape by ashing; therefore, a resist mask with different shapes can be formed without a photolithography step being performed. Thus, the number of light-exposure masks can be reduced and the number of corresponding photolithography steps can also be reduced, whereby simplification of a process can be realized.

Note that it is preferable that etching conditions be optimized so as not to etch and divide the oxide semiconductor layer 2531 when the conductive layer is etched. However, it is difficult to obtain etching conditions in which only the conductive layer is etched and the oxide semiconductor layer 2531 is not etched at all. In some cases, only part of the oxide semiconductor layer 2531 is etched to be an oxide semiconductor layer having a groove portion (a recessed portion) when the conductive layer is etched.

In this embodiment, a Ti layer is used as the conductive layer and an In—Ga—Zn—O-based oxide semiconductor is used as the oxide semiconductor layer 2531; thus, an ammonia peroxide mixture (a solution in which hydrogen peroxide water of 31 wt %, ammonia water of 28 wt %, and water are mixed at a volume ratio of 2:1:1) may be used as an etchant for etching the conductive layer.

Next, the insulating layer 2516 serving as a protective insulating layer is formed in contact with part of the oxide semiconductor layer. Before the formation of the insulating layer 2516, plasma treatment using a gas such as $N_2O$, $N_2$, or Ar may be performed to remove water or the like adsorbed on an exposed surface of the oxide semiconductor layer.

The insulating layer 2516 can be formed to a thickness of at least 1 nm by a method through which impurities such as water and hydrogen do not enter the insulating layer 2516, such as a sputtering method, as appropriate. When hydrogen is contained in the insulating layer 2516, hydrogen might enter the oxide semiconductor layer or oxygen might be extracted from the oxide semiconductor layer by hydrogen. In such a case, the resistance of the oxide semiconductor layer on the backchannel side might be decreased (the oxide semiconductor layer on the backchannel side might have n-type conductivity) and a parasitic channel might be formed. Therefore, it is important to form the insulating layer 2516 by a method through which hydrogen and impurities containing hydrogen are not contained therein.

Note that a gallium oxide layer may be formed instead of the insulating layer 2516 or formed between the insulating layer 2516 and the oxide semiconductor layer, so as to be in contact with part of the oxide semiconductor layer. Gallium oxide is a material which is hardly charged; therefore, variation in threshold voltage due to charge buildup of the insulating layer can be suppressed.

In this embodiment, a silicon oxide layer is formed to a thickness of 200 nm as the insulating layer 2516 by a sputtering method. The substrate temperature in deposition may be higher than or equal to room temperature and lower than or equal to 300° C. and in this embodiment, is 100° C. The silicon oxide layer can be formed by a sputtering method in a rare gas (typically, argon) atmosphere, an oxygen atmosphere, or a mixed atmosphere containing a rare gas and oxygen. As a target, a silicon oxide target or a silicon target can be used. For example, the silicon oxide layer can be formed using a silicon target by a sputtering method in an atmosphere containing oxygen. For the insulating layer 2516 which is formed in contact with the oxide semiconductor layer, an inorganic insulating layer that hardly contains impurities such as moisture, a hydrogen ion, and hydroxyl and that blocks entry of such impurities from the outside is preferably used. Typically, a silicon oxide layer, a silicon oxynitride layer, an aluminum oxide layer, an aluminum oxynitride layer, or the like can be used.

In order to remove moisture remaining in the deposition chamber of the insulating layer 2516 at the same time as deposition of the oxide semiconductor layer 2530, an entrapment vacuum pump (such as a cryopump) is preferably used. When the insulating layer 2516 is deposited in the deposition chamber evacuated using a cryopump, the impurity concentration in the insulating layer 2516 can be reduced. In addition, as an evacuation unit for removing moisture remaining in the deposition chamber of the insulating layer 2516, a turbo molecular pump provided with a cold trap may be used.

It is preferable that a high-purity gas from which impurities such as hydrogen, water, hydroxyl, and hydride is removed be used as the sputtering gas for the deposition of the insulating layer 2516.

Next, second heat treatment (preferably at higher than or equal to 200° C. and lower than or equal to 400° C., for example, higher than or equal to 250° C. and lower than or equal to 350° C.) is performed in an inert gas atmosphere or an oxygen gas atmosphere. For example, the second heat treatment is performed at 250° C. for 1 hour in a nitrogen atmosphere. In the second heat treatment, part of the oxide semiconductor layer (a channel formation region) is heated in the state where it is in contact with the insulating layer 2516.

Through the above steps, oxygen which is one of main components of an oxide semiconductor and which is reduced together with impurities such as hydrogen, moisture, hydroxyl, and hydride (also referred to as a hydrogen compound) through the first heat treatment performed on the oxide semiconductor layer can be supplied. Thus, the oxide semiconductor layer is highly purified and is made to be an electrically i-type (intrinsic) semiconductor.

Figure 8D:
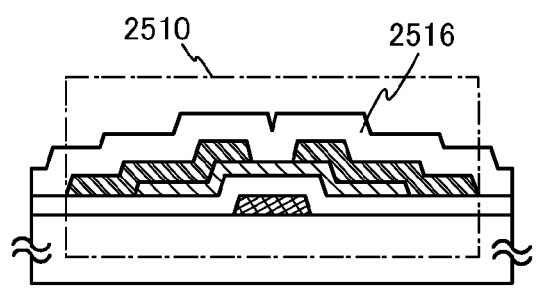
Figure 8E:
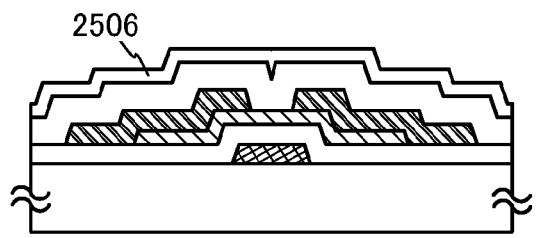

Through the above steps, the transistor 2510 is formed (see FIG. 8D).

When a silicon oxide layer having a lot of defects is used as the oxide insulating layer, impurities such as hydrogen, moisture, hydroxyl, or hydride contained in the oxide semiconductor layer can be diffused into the silicon oxide layer through the heat treatment performed after the silicon oxide layer is formed. That is, the impurities contained in the oxide semiconductor layer can be further reduced.

A protective insulating layer 2506 may be further formed over the insulating layer 2516. For example, a silicon nitride layer is formed by a sputtering method. An inorganic insulating layer which hardly contains impurities such as moisture and can prevent entry of the impurities from the outside, such as a silicon nitride layer or an aluminum nitride layer, is preferably used as the protective insulating layer. In this embodiment, a silicon nitride layer is used as the protective insulating layer 2506 (see FIG. 8E).

A silicon nitride layer used as the protective insulating layer 2506 is formed in such a manner that the substrate 2505 over which layers up to the insulating layer 2516 are formed is heated to higher than or equal to 100° C. and lower than or equal to 400° C., a sputtering gas containing high-purity nitrogen from which hydrogen and water are removed is introduced, and a target of silicon is used. In that case also, the protective insulating layer 2506 is preferably formed while moisture remaining in the treatment chamber is removed, similarly to the insulating layer 2516.

After the protective insulating layer is formed, heat treatment may be further performed at higher than or equal to 100° C. and lower than or equal to 200° C. for longer than or equal to 1 hour and shorter than or equal to 30 hours in air. This heat treatment may be performed at a fixed heating temperature. Alternatively, the following change in temperature is set as one cycle and may be repeated plural times: the temperature is increased from room temperature to a heating temperature and then decreased to room temperature.

As described above, with the use of the transistor including a highly purified oxide semiconductor in the channel formation region which is manufactured using this embodiment, the current value in an off state (off-state current value) can be further reduced.

In addition, since the transistor including a highly purified oxide semiconductor in the channel formation region has high field-effect mobility, high-speed operation is possible. Thus, a driver circuit for which high-speed operation is required, such as the potential detecting circuit 310, the switch control circuit 311, or the high-frequency wave supply circuit 308 can be formed over the same substrate as the switch 303; therefore, the number of components can be reduced.

This embodiment can be implemented in appropriate combination with any of the other embodiments.

Embodiment 6

In this embodiment, application examples of the power supply device shown in any of the above embodiments will be described with reference to FIGS. 9A and 9B.

Figure 9A:
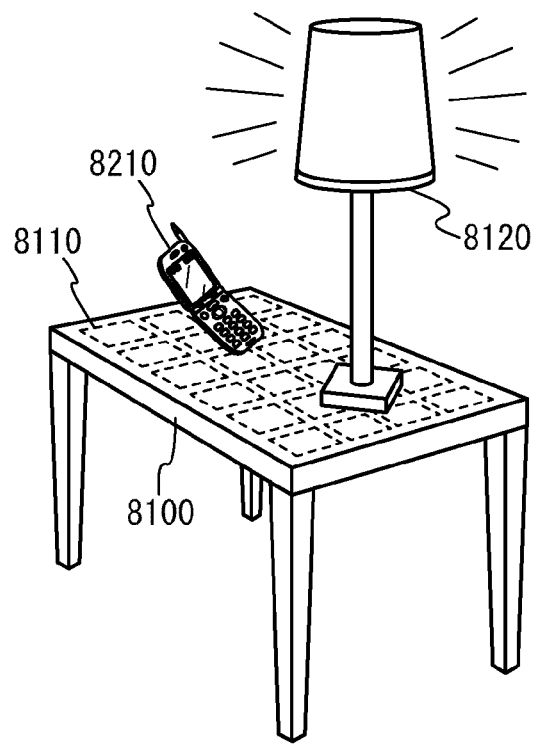
FIGS. 9A and 9B illustrate application examples of a power supply device.

FIG. 9A shows an example in which the power supply device including power feeding cells 8110 arranged in a matrix is provided on a table 8100. The power supply device is not necessarily provided over the uppermost part of a top plate and can be provided inside the top plate or in the lower portion of the top plate. That is, the power supply device can be provided without marring the appearance of the table 8100.

A table lamp 8120 placed on the table 8100 includes the power receiving device. Power transmitted from the power supply device is received by the power receiving device, so that the lamp can be lighted. Since the power feeding cells 8110 are provided over the whole top plate of the table 8100, when the table lamp 8120 is placed in any place on the top plate, the lamp can be lighted without consideration of a power supply cord.

When a mobile phone 8210 including the power receiving device is placed on the table 8100, a built-in battery of the mobile phone 8210 can be charged without providing an electrical contact. The mobile phone 8210 can easily have a waterproof function or the like because an electrical contact is not necessarily provided for the mobile phone 8210.

Figure 9B:
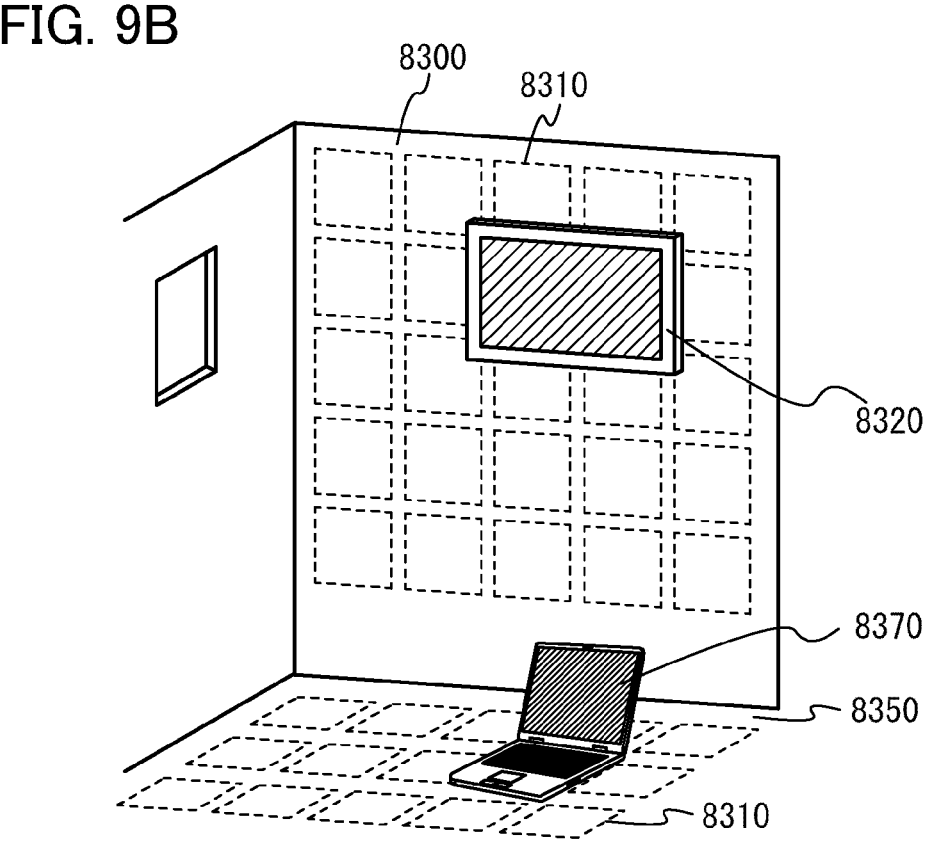

FIG. 9B shows an example in which the power supply device including power feeding cells 8310 arranged in a matrix is placed on a wall 8300 and a floor 8350. Since the power supply device can be provided inside the wall or the floor, the power supply device can be provided without marring the appearance of the wall or the floor.

A television 8320 placed on the wall 8300 includes the power receiving device. Power transmitted from the power supply device placed in the wall 8300 is received by the power receiving device, so that an image can be displayed. By providing the power supply device in the whole wall 8300, the television 8320 can be placed on an arbitrary place of the wall 8300 without consideration of a power supply cord.

A laptop computer 8370 placed on the floor 8350 includes the power receiving device. Power transmitted from the power supply device is received by the power receiving device, so that the laptop computer 8370 can operate and a built-in battery can be charged. By providing the power supply device on the whole floor 8350, the laptop computer 8370 can operate on an arbitrary place of the floor 8350 without consideration of a power supply cord.

This application is based on Japanese Patent Application serial no. 2010-083153 filed with Japan Patent Office on Mar. 31, 2010, the entire contents of which are hereby incorporated by reference.

The invention claimed is:

1. A power supply device comprising:
an antenna sheet with a plurality of cells arranged in a matrix, each of the cells comprises one terminal of an antenna connected to one terminal of a transistor;
a high-frequency wave supply circuit connected to the other terminal of the transistor;
a potential detecting circuit connected to the other terminal of the antenna; and
a switch control circuit transmitting a first signal for a position detection operation and a second signal for a power feeding operation to a control terminal of the transistor,
wherein a channel formation region of the transistor comprises an oxide semiconductor, and
wherein the transistor is configured to feed power and detect a position.

2. The power supply device according to claim 1, wherein the antenna is a coiled antenna.

3. The power supply device according to claim 1, wherein a frequency of a high-frequency wave supplied from the high-frequency wave supply circuit is 1 MHz or higher.

4. A method for driving a power supply device comprising a plurality of cells arranged in a matrix, a high-frequency wave supply circuit, a switch control circuit, and a potential detecting circuit and supplying power to a power receiving device which gets close to a cell of the cells, comprising the steps of:
detecting the cell to which the power receiving device gets close with a high-frequency position detection wave by a position detection operation; and
supplying power with a high-frequency power feeding wave from the detected cell by a power feeding operation,
wherein a channel formation region of a thin film transistor of the power supply device comprises an oxide semiconductor,
wherein the thin film transistor is configured to feed power and detect a position alternately, and
wherein a switch control circuit transmits a first signal for the position detection operation and a second signal for the power feeding operation to a control terminal of the transistor.

5. The method for driving a power supply device according to claim 4,
wherein an operation period of the power feeding operation is longer than an operation period of the position detection operation.

6. The method for driving a power supply device according to claim 4,
wherein power of the high-frequency power feeding wave is larger than power of the high-frequency position detection wave.

7. The method for driving a power supply device according to claim 4,
wherein the high-frequency position detection wave and the high-frequency power feeding wave are high-frequency waves with a same frequency.

8. A power supply device comprising:
an antenna sheet with a plurality of cells arranged in a matrix, each of the cells comprises one terminal of an antenna that is connected to one terminal of a transistor;
a high-frequency wave supply circuit connected to the other terminal of the transistor;
a potential detecting circuit connected to the other terminal of the antenna; and
a switch control circuit transmitting a first signal for a position detection operation and a second signal for a power feeding operation to a control terminal of the transistor,
wherein the transistor is configured to feed power and detect a position, and
wherein a channel formation region of the transistor comprises an oxide semiconductor containing In and Zn.

9. The power supply device according to claim 8, wherein the antenna is a coiled antenna.

10. The power supply device according to claim 8, wherein a frequency of a high-frequency wave supplied from the high-frequency wave supply circuit is 1 MHz or higher.

11. The power supply device according to claim 1, wherein a frequency of a high-frequency wave used for the position detection operation is 5 MHz or higher.

12. A table comprising the power supply device according to claim 8.

13. A wall comprising the power supply device according to claim 8.

14. A floor comprising the power supply device according to claim 8.

15. A table comprising the power supply device according to claim 1.

16. A wall comprising the power supply device according to claim 1.

17. A floor comprising the power supply device according to claim 1.

18. The power supply device according to claim 8, wherein the oxide semiconductor further contains Ga.

19. The power supply device according to claim 1, wherein the transistor has both a function of feeding the power and a function of detecting the position.

20. The power supply device according to claim 1, wherein a carrier density of the oxide semiconductor is less than $1\times10^{12}/cm^3$.

* * * * *